(12) United States Patent
Chen et al.

(10) Patent No.: US 8,031,943 B2
(45) Date of Patent: *Oct. 4, 2011

(54) AUTOMATIC NATURAL LANGUAGE TRANSLATION OF EMBEDDED TEXT REGIONS IN IMAGES DURING INFORMATION TRANSFER

(75) Inventors: Yen-Fu Chen, Austin, TX (US); John W. Dunsmoir, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 472 days.

This patent is subject to a terminal disclaimer.

(21) Appl. No.: 12/192,391

(22) Filed: Aug. 15, 2008

(65) Prior Publication Data

US 2008/0300859 A1 Dec. 4, 2008

Related U.S. Application Data

(63) Continuation of application No. 10/865,347, filed on Jun. 10, 2004, now Pat. No. 7,496,230, which is a continuation-in-part of application No. 10/455,159, filed on Jun. 5, 2003, now Pat. No. 7,310,781, and a continuation-in-part of application No. 10/692,173, filed on Oct. 23, 2003, and a continuation-in-part of application No. 10/755,832, filed on Jan. 12, 2004, now Pat. No. 7,475,390.

(51) Int. Cl.
| | |
|---|---|
| G06F 17/00 | (2006.01) |
| G06F 17/20 | (2006.01) |
| G06F 17/21 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. ........ 382/182; 715/259; 715/265; 715/271; 704/2; 704/3; 704/9

(58) Field of Classification Search .................. 382/182; 715/259, 265, 271; 704/2, 3, 9

See application file for complete search history.

(56) References Cited

U.S. PATENT DOCUMENTS 4,688,033 A 8/1987 Carini et al.
(Continued)

FOREIGN PATENT DOCUMENTS

AU WO 02071259 12/2002
(Continued)

OTHER PUBLICATIONS

USPTO; recent examination correspondence in related U.S. Appl. No. 11/947,350, filed Nov. 29, 2007 by Yen Fu Chen.

(Continued)

*Primary Examiner* — John B Strege
(74) *Attorney, Agent, or Firm* — Robert H. Frantz; Mark C. Vallone

(57) ABSTRACT

Text regions of natural language embedded in images are automatically translated via a clipboard buffer during a cut-and-paste command according to an isolation rule defining one or more types of image elements to be isolated, by examining the image elements, responsive to meeting the isolation rule, transferring the image element from the clipboard to an isolation store, disabling pasting of the image element; recognizing text within the isolated image; determining a natural language in which the recognized text is expressed; performing natural language translation of the recognized text into a user-specified destination natural language; producing image data for the translated text; overlaying the image data onto the embedded text in the isolated image element; and pasting the modified image element from the isolation store to a user-designated destination points within a destination computer file.

20 Claims, 11 Drawing Sheets

U.S. PATENT DOCUMENTS

| | | |
|---|---|---|
| 4,890,247 A | 12/1989 | Sarrine et al. |
| 5,097,418 A | 3/1992 | Nurse et al. |
| 5,283,856 A | 2/1994 | Gross et al. |
| 5,367,623 A | 11/1994 | Iwai et al. |
| 5,426,583 A | 6/1995 | Uribe-Echebarria Diaz De Mendibil |
| 5,440,678 A | 8/1995 | Eisen et al. |
| 5,544,300 A | 8/1996 | Skarbo et al. |
| 5,579,521 A | 11/1996 | Shearer et al. |
| 5,583,761 A | 12/1996 | Chou |
| 5,586,025 A | 12/1996 | Tsuji et al. |
| 5,590,266 A | 12/1996 | Carson |
| 5,614,703 A | 3/1997 | Martin et al. |
| 5,666,552 A | 9/1997 | Greyson et al. |
| 5,678,039 A | 10/1997 | Hinks et al. |
| 5,706,458 A | 1/1998 | Koppolu |
| 5,765,156 A | 6/1998 | Guzak et al. |
| 5,781,192 A | 7/1998 | Kodimer |
| 5,801,693 A | 9/1998 | Bailey |
| 5,864,830 A | 1/1999 | Armetta et al. |
| 5,897,643 A | 4/1999 | Matsumoto |
| 5,897,650 A | 4/1999 | Nakajima et al. |
| 5,924,099 A | 7/1999 | Guzak et al. |
| 5,929,854 A | 7/1999 | Ross |
| 5,956,736 A | 9/1999 | Hanson et al. |
| 5,964,834 A | 10/1999 | Crutcher |
| 5,974,372 A | 10/1999 | Barnes |
| 5,995,103 A | 11/1999 | Ashe |
| 6,023,679 A | 2/2000 | Acebo et al. |
| 6,032,134 A | 2/2000 | Weissman |
| 6,044,135 A | 3/2000 | Katz |
| 6,070,244 A | 5/2000 | Orchier et al. |
| 6,108,668 A | 8/2000 | Bates et al. |
| 6,177,939 B1 | 1/2001 | Blish et al. |
| 6,192,378 B1 | 2/2001 | Abrams |
| 6,195,420 B1 | 2/2001 | Tognazzini |
| 6,212,577 B1 | 4/2001 | Stern et al. |
| 6,236,955 B1 | 5/2001 | Summers |
| 6,240,430 B1 | 5/2001 | Deike et al. |
| 6,262,852 B1 | 7/2001 | Takahashi |
| 6,266,683 B1 | 7/2001 | Yehuda et al. |
| 6,268,852 B1 | 7/2001 | Lindhorst et al. |
| 6,272,505 B1 | 8/2001 | De La Huerga |
| 6,289,330 B1 | 9/2001 | Jannarone |
| 6,309,305 B1 | 10/2001 | Kraft |
| 6,313,855 B1 | 11/2001 | Shuping |
| 6,324,498 B1 | 11/2001 | Wajda |
| 6,360,205 B1 | 3/2002 | Iyengar et al. |
| 6,381,567 B1 | 4/2002 | Christensen et al. |
| 6,401,118 B1 | 6/2002 | Thomas |
| 6,449,616 B1 | 9/2002 | Walker et al. |
| 6,453,268 B1 | 9/2002 | Carney et al. |
| 6,477,503 B1 | 11/2002 | Mankes |
| 6,496,841 B1 | 12/2002 | Tognazzini |
| 6,519,631 B1 | 2/2003 | Rosenschein et al. |
| 6,560,608 B1 | 5/2003 | Tomm et al. |
| 6,567,973 B1 | 5/2003 | Yamamoto et al. |
| 6,587,837 B1 | 7/2003 | Spagna et al. |
| 6,591,094 B1 | 7/2003 | Bentley |
| 6,735,701 B1 | 5/2004 | Jacobson |
| 6,773,266 B1 | 8/2004 | Dornbush et al. |
| 6,789,252 B1 | 9/2004 | Burke et al. |
| 6,807,668 B2 | 10/2004 | Stern et al. |
| 6,873,957 B1 | 3/2005 | Chen et al. |
| 6,891,551 B2 | 5/2005 | Keely et al. |
| 6,901,367 B1 | 5/2005 | Berstis |
| 6,993,473 B2 | 1/2006 | Cartus |
| 7,036,092 B2 | 4/2006 | Sloo et al. |
| 7,167,904 B1 | 1/2007 | Devarajan et al. |
| 7,171,468 B2 | 1/2007 | Yeung et al. |
| 7,185,274 B1 | 2/2007 | Rubin et al. |
| 7,293,242 B2 | 11/2007 | Cossey et al. |
| 7,310,781 B2 | 12/2007 | Chen et al. |
| 7,328,166 B1 | 2/2008 | Geoghegan et al. |
| 7,340,685 B2 | 3/2008 | Chen et al. |
| 7,346,853 B2 | 3/2008 | Chen et al. |
| 7,475,390 B2 | 1/2009 | Berstis |
| 7,478,336 B2 | 1/2009 | Chen et al. |
| 7,496,230 B2 | 2/2009 | Chen et al. |
| 7,503,012 B2 | 3/2009 | Chen et al. |
| 2001/0016825 A1 | 8/2001 | Pugliese, III et al. |
| 2001/0049613 A1 | 12/2001 | Gramann, III et al. |
| 2002/0002452 A1 | 1/2002 | Christy et al. |
| 2002/0052893 A1 | 5/2002 | Grobler et al. |
| 2002/0054092 A1 | 5/2002 | Hedloy |
| 2002/0082877 A1 | 6/2002 | Schiff et al. |
| 2002/0156672 A1 | 10/2002 | Burko |
| 2002/0186255 A1 | 12/2002 | Shafron et al. |
| 2002/0188670 A1 | 12/2002 | Stringham |
| 2003/0004760 A1 | 1/2003 | Schiff et al. |
| 2003/0007007 A1 | 1/2003 | Hinegardner |
| 2003/0036929 A1 | 2/2003 | Vaughan et al. |
| 2003/0040900 A1 | 2/2003 | D'Agostini |
| 2003/0061145 A1 | 3/2003 | Norrid |
| 2003/0125927 A1 | 7/2003 | Seme |
| 2003/0135476 A1 | 7/2003 | Holland et al. |
| 2003/0200078 A1 | 10/2003 | Luo et al. |
| 2004/0027382 A1 | 2/2004 | Kuehn et al. |
| 2004/0039995 A1 | 2/2004 | Kuwata et al. |
| 2004/0150215 A1 | 8/2004 | King |
| 2004/0181753 A1 | 9/2004 | Michaelides |
| 2004/0205493 A1 | 10/2004 | Simpson et al. |
| 2004/0250215 A1 | 12/2004 | Chen et al. |
| 2004/0257346 A1 | 12/2004 | Ong et al. |
| 2004/0260535 A1 | 12/2004 | Chen |
| 2004/0267823 A1 | 12/2004 | Shapiro et al. |
| 2005/0091603 A1 | 4/2005 | Chen |
| 2005/0102629 A1 | 5/2005 | Chen |
| 2005/0102630 A1 | 5/2005 | Chen |
| 2005/0132280 A1 | 6/2005 | Broman et al. |
| 2005/0154992 A1 | 7/2005 | Chen |
| 2005/0154993 A1 | 7/2005 | Chen |
| 2005/0154994 A1 | 7/2005 | Chen |
| 2005/0155017 A1 | 7/2005 | Berstis et al. |
| 2006/0224903 A1 | 10/2006 | Ginter et al. |
| 2006/0253330 A1 | 11/2006 | Maggio et al. |
| 2006/0282319 A1 | 12/2006 | Maggio |
| 2008/0072144 A1 | 3/2008 | Chen |
| 2008/0098317 A1 | 4/2008 | Chen |
| 2008/0300859 A1 | 12/2008 | Chen |
| 2009/0030672 A1 | 1/2009 | Berstis |
| 2009/0044140 A1 | 2/2009 | Chen et al. |

FOREIGN PATENT DOCUMENTS

| | | |
|---|---|---|
| JP | 2001250005 | 9/2001 |

OTHER PUBLICATIONS

Apperley, Mark, et al.; "Breaking the copy/paste cycle: the stretchable selection tool", published: 2000.

U.S. Appl. No. 10/455,159.

U.S. Appl. No. 10/692,173.

U.S. Appl. No. 10/703,012.

U.S. Appl. No. 10/755,831.

Courter, et al. Mastering Microsoft Office 2000 Professional Edition, (c) 1999, SYBEX, pp. 35, 37.

IBM, Technical Disclosure Bulletin "Multiple Item On-line Clipboard", Jul. 1992, p. 425.

Microsoft Corp., "OLE Concepts and Requirements Overview", three pages, 1999.

USPTO; recent examination correspondence in related U.S. Appl. No. 10/692,173, filed Oct. 23, 2003 by Yen-Fu Chen, currently on Appeal.

USPTO; recent examination correspondence in related U.S. Appl. No. 11/961,813, filed Dec. 20, 2007 by Yen-Fu Chen.

USPTO; recent examination correspondence (Reply Brief in Appeal of Dec. 27, 2010) in related U.S. Appl. No. 10/692,173, filed Oct. 23, 2003 by Yen-Fu Chen, currently on Appeal.

USPTO; recent correspondence after Apr. 15, 2010 in related U.S. Appl. No. 10/692,173, filed by Yen-Fu Chen on Oct. 23, 2003.

"PROject Mt Ltd.—UDDI Business (Provider) Details" downloaded from http://www.bindingpoint.com/ on Nov. 4, 2003.

Akers; "LogMedia Translate Version 2.0"; 2002; pp. 220-223.

AMA Citation Style by Long Island University, downloaded on Nov. 6, 2003 from http://www.liu/edu/cwis/cwp/library/workshop.

APA Citation Style by Long Island University, downloaded on Nov. 6, 2003 from http://www.liu.edu/cwis/cwp/library/workshop.

Chicago Citation Style by Long Island University, downloaded on Nov. 6, 2003 from http://www.liu.edu/cwis/cwp/library/workshop.

Citation Style for Research Papers by Long Island University, downloaded on Nov. 6, 2003 from http://www.liu.edu/cwis/cwp/library/workshop.

Clipboard Magic, v4.1 by Cyber-Matrix, http://www.filebuzz.com/fileinfo/317/Clipboard.sub.—Magic.html, Fig. 1.

Clipboard Magic, v4.1 by Cyber-Matrix, Jul. 4, 2005, http://www.filebuzz.com/fileinfo/317/Clipboard.sub.—Magic.html, Fig. 1.

Cybermatrix, "Clipboard Magic [TM]: Free Multiple Storage Clipboard Utility", Version 4.01, retrieved on Apr. 7, 2008 from http://www.cybermatrix.com/clipboard.sub.—magic.html, 3 pages (please note "version history" link in Product Quick Links box, upper right portion of first page).

Cybermatrix, "Clipboard Magic Version History", retrieve on Apr. 7, 2008 from http://www.cybermatrix.com/changes/cmagic.html, 6 pages (please note v4.01 release date of Nov. 22, 2005 at top of first page).

File Buzz, "Clipboard Magic v4.01", retrieved on Apr. 7, 2008 from http://www.filebuzz.com/fileinfo/317/Clipboard.sub.—Magic.html, 2 pages (please note copyright date at bottom of second page).

John Kaufeld, Access 97 for Windows for Dummies, Copyright (c) 1996, IDG Books Worldwide, Inc. pp. 24, 68, 77, 82, 89, 299, 300.

Lingua Translator Web Service—XML Web Service Details downloaded from http://www.bindingpoint.com/ on Nov. 4, 2003.

Miller et al.; "Syncrhonizing Clipboards of Multiple Computers", ACM, 1999, vol. 1.1, pp. 65-66.

MLA Citation Style by Long Island University, downloaded on Nov. 6, 2003 from http://www.liu.edu/cwis/cwp/library/workshop.

Screen shot from "AltaVista's Babel Fish Translation Service", performed from http://babelfish.altavista.com/babelfish on Oct. 30, 2003.

TechSmith Corp, SnagIT User's Guide, 2002.

Turabian Citation Style by Long Island University, downloaded on Nov. 6, 2003 from http://www.liu.edu/cwis/cwp/library/workshop.

University of Kentucky, WS.sub.—FTP Quick REference Guide, Apr. 3, 2000, http://www.uky.edu/SCS/documents/Win-wsftplwin-wsftppf.html.

USPTO; Examination Correspondence from a Related U.S. Appl. No. 12/251,567; filed on Oct. 15, 2008 by Yen-Fu Chen.

USPTO; Examination Correspondence from a Related U.S. Appl. No. 12/245,403; filed on Oct. 3, 2008 by Viktors Berstis.

USPTO; Examination Correspondence from a Related U.S. Appl. No. 12/245,279; filed on Oct. 3, 2008 by Viktors Berstis.

USPTO; Examination Correspondence from a Related U.S. Appl. No. 11/947,350; filed on Nov. 29, 2007 by Yen-Fu Chen.

AUTOMATIC NATURAL LANGUAGE TRANSLATION OF EMBEDDED TEXT REGIONS IN IMAGES DURING INFORMATION TRANSFER

CROSS-REFERENCE TO RELATED APPLICATIONS (CLAIMING BENEFIT UNDER 35 U.S.C. 120)

This patent application is a continuation of U.S. patent application Ser. No. 10/865,347, filed on Jun. 10, 2004, now U.S. Pat. No. 7,496,230, now under allowance, which was a continuation in part of the following U.S. patent applications: (a) application Ser. No. 10/455,159, filed on Jun. 5, 2003, now U.S. Pat. No. 7,310,781; (b) application Ser. No. 10/692,173, filed on Oct. 23, 2003, which is currently pending; and (c) application Ser. No. 10/755,832, filed on Jan. 12, 2004, now U.S. Pat. No. 7,475,390 which is currently pending, all of which were filed by common inventor, also filed by Yen-Fu Chen, et al., and are commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. No. 10/865,347, filed on Jun. 10, 2004, application Ser. No. 10/455,159, filed on Jun. 5, 2003; application Ser. No. 10/692,173, filed on Oct. 23, 2003; and (c) application Ser. No. 10/755,832, filed on Jan. 12, 2004, are incorporated by reference, in their entireties including figures, to the present patent application

BACKGROUND OF THE INVENTION

This patent application is a continuation of U.S. patent application Ser. No. 10/865,347, filed on Jun. 10, 2004, now under allowance, which was a continuation in part of the following U.S. patent applications: (a) application Ser. No. 10/455,159, filed on Jun. 5, 2003, now U.S. Pat. No. 7,310,781; (b) application Ser. No. 10/692,173, filed on Oct. 23, 2003, which is currently pending; and (c) application Ser. No. 10/755,832, filed on Jan. 12, 2004, which is currently pending, all of which were filed by common inventor, also filed by Yen-Fu Chen, et al., and are commonly assigned.

FIELD OF THE INVENTION

This invention relates to methods for transferring information from one computer resource to another computer resource during which the information is translated from an initial natural or native language to a selected destination language. This invention relates especially to the handling of text embedded and encoded in images when transferred between computer programs.

BACKGROUND OF THE INVENTION

Modern multi-tasking computers provide a variety of user interfaces for controlling multiple application programs and system functions which operate simultaneously. Some of the most widely used multi-tasking computer systems are personal computers ("PC") running a multi-tasking operating system ("OS") such as International Business Machines' ("IBM") OS/2™ or AIX™, Microsoft Windows™, and Apple Computer's MacOS™. Other operating systems may be used with personal computers as well as larger computers such as enterprise-class computers, such as UNIX, Sun Microsystems' Solaris™, Hewlett Packard's HP-UX™, and the "open sourced" LINUX. Smaller computing platforms such as held-held computers, personal digital assistants ("PDA"), and advanced wireless telephones may run operating systems targeted for such hardware including Palm Computing's PalmOS™ and Microsoft's Windows CE™. Additionally, there are many "proprietary" and less widely-used computing platforms and operating systems which also allow users to control and run multiple programs and system functions simultaneously.

Many of these systems will use tabs, icons, windows, frames, pages and special key combinations to allow a user to switch between user interfaces ("UI") for each program and system function which is being executed, or to start or stop the execution of a program or system function. For example, in a personal computer running MS Windows™, the user may first start a web browser program running using several methods (e.g. double clicking an icon on the desktop, selecting the program from a Start Programs list, operating a "hot key", etc.), and then may start a document editor program using similar methods. Each program establishes a user interface such as its own "window". The user can then control a program by selecting its window using one of several available methods, such as selecting a button or icon on a command bar, activating a "task list" and selecting a program, etc. As a result, a user can start and run many programs simultaneously, periodically switching between their user interfaces to accomplish work or entertainment tasks as needed. Other computing systems provide similar basic user control capabilities, albeit with a variety of user controls to switch between programs and system functions.

Users often wish to copy or transfer information or "content" from one program or system function to another. For example, a user may be preparing an invoice for a client using a word processor program, but may also be simultaneously using a database or spreadsheet program to perform various calculations. Using "copy and paste" functions of the application programs and the operating system, the user may select information from a source program (e.g. the spreadsheet), and "paste" it into the destination program (e.g. the invoice being edited). Such a process is so common place in computer users' daily lives that it is rote, albeit each user may know several sequences of actions for several computers which he or she commonly uses (e.g. one process on his home PC, another on his PDA, and another on his networked terminal at work). These memorized methods may typically include several steps of clicking on icons, dropping down lists, highlighting information, and using navigation controls within program UI's.

For example, turning to FIG. 1, a "windows" style user interface is depicted to illustrate a process of "copying" information from a web browser program to a word processor file via a "clipboard" memory. In this system, each program provides a window (2, 3, 104) which can be closed (9, 9') to end the program, maximized (8, 8') to view the full UI for that program, or minimized (7, 7') to leave the program running but deactivate the UI (e.g. clear the UI window from the screen). In this example, these controls are located in a command bar (4, 4') along the top of the UI window, but many other variations are known in the art.

Each UI window also typically has navigation controls such as left panning (15, 15'), right panning (13, 13'), and horizontal scroll (14, 14') controls, as well as up panning (10, 10'), down panning (12, 12'), and vertical scroll (11, 11'), for viewing areas of information and content not completely viewable in the UI. Information, icons, text, graphics, etc., are shown or displayed within (16, 18) the UI window according to the scroll and panning control settings. More recently, the term "content" (16, 18) has been used to collectively refer to all types of information which may be displayed or presented in a user interface, including but not limited to text, graphics, still images, animated images, video, audio, and hyperlinks.

Now suppose for the purpose of our example, the user has started a word processing program which provides a first UI window (2), and a web browser which provides a second UI window (3). Also suppose that the user is researching information on the Internet using the web browser while authoring a paper which is being edited simultaneously using the word processor.

In this example, the user has found information (19) at a hypothetical web address (17) that he wants to "quote" in his or her paper. So, the user must first move the cursor (104) in the word processor to select an insertion point for the information, then must switch to the web browser UI, select the text (19) in the source content, operate a "copy" command in the web browser UI which copies (101) the content into a buffer (100) such as a "clipboard", switch back to the word processor UI, and operate a "paste" or "insert" command, which results in the copied content (19) being inserted into the destination document at the point of insertion (103). The user can repeat this process for many different program UI's (106).

In some software and hardware configurations, the copy buffer may be provided within a suite of application programs which are "tightly coupled" or related. Such suites cooperate with each other in ways not possible with software programs provided by differing suppliers. In many cases, however, the operating system provides a buffer function which is generally accessible by all programs, such as the clipboard in the MS Windows™ operating system.

Also, in some situations, the original content with its original format may not be acceptable by the destination program, and as such, a specialized paste or insertion function (105) may be provided by the destination program or operating system which converts the content to a form useful by the destination program. For example, text copied from a web page may include color, size, font, style, and hyperlink reference information embedded in the base Hyper Text Markup Language ("HTML") of the source web page. However, not all word processors are able to interpret all of these special codes and identifiers, so a "paste as plain text" option may be provided by a converter or translator (105) function.

So, to illustrate the complexity and tedious nature of such ordinary operations, we present the steps in full to accomplish this example scenario of simply transferring a block of formatted text from a web page to a word processor program, starting from a point where the user is editing the destination document in the word processor:

(a) navigate to the insertion point in the destination document using the word processor UI window controls (e.g. multiple clicks on scroll, panning or page up/page down keys);

(b) optionally select text or content in the destination document which is to be replaced;

(c) switch to the web browser UI window (e.g. click on an icon in a task bar, activate a task list and pick a running web browser program, etc.);

(d) navigate in the web browser UI window to find the text or content desired to be transferred into the document (e.g. use panning, scrolling, or page up/page down keys);

(e) select the source content or text (e.g. click-and-drag over the content to highlight it)

(f) transfer the content to a copy buffer (e.g. click on "Edit" command, select "copy" option or type Alt-E, Alt-C);

(g) switch back to the word processor UI window (e.g. (e.g. click on a icon in a task bar, activate a task list and pick a running web browser program, etc.); and (h) operate a "paste" command in the word processor UI window (e.g. click on "Edit" command, select "paste" option or type Alt-E, Alt-P).

Each of these operations may actually require several steps (clicking, scrolling, selecting, typing, etc.), so this minimal process may represent 7 to 25 actual user actions. This process must be repeated for each block of text or content to be transferred from multiple program UI windows (106), and additional steps may be necessary to achieve a "special paste", as described above. Also, if the same text or content is to be inserted into the destination document for file at multiple locations, the last few operations of this process (h) in addition to some navigation actions must by performed by the user.

As a result, consolidating information from multiple sources of information may be extremely tedious, frustrating, and tiresome using the currently available methods and apparatuses provided in such computing systems. Some systems may provide notably more "user friendly" or intuitive methods, while other systems are much more difficult and "clunky" to use.

Turning now to FIG. 2, this type of process is generalized. Starting at a point or time (21) when the user is actively working with the destination program UI, the user must navigate (22) within the present document, file, or other computer resource to a point where the content insertion is to be made, including selecting any content which is to be replaced. Then, the user must switch (23) to the UI of the first source of information, navigate (24) to the first source content to be transferred, select that content, and operate (25) a copy or cut control in the first source UI.

Next, the user must switch (26) back to the destination UI, and operate (27) an insert or paste command in that UI. If (28) the user wants to insert or paste that content into multiple destinations, the user must navigate (29) to each destination and operate (27) the paste or insert command in the destination program UI, until all insertions have been made for that source information.

If (200) the user desires to transfer information from other points in the same source, or from other sources, the user must repeatedly switch (201) to a source UI, navigate to a source content point, select source information, operate (25) a copy or cut operation, switch (26) back to the destination UI, and paste or insert (27) the content, until all information has been transferred.

Implied, but not shown in detail, in this generalization of the process can be multiple user actions for each general step. Optionally, options such as conversion of the content may be necessary, which requires additional user actions (e.g. the "paste as plain text" example).

So, it is possible that in the course of authoring a paper using a word processor and information from several sources, the user may have to perform hundreds of tedious actions, commands, selections, navigation operations, etc.

In this paradigm, certain conventions have evolved into place which only moderately simplify or reduce the burden of such operations. For example, performing a "cut" operation usually deletes the selected source content from the source file, and places a copy of it into the transfer buffer, sometimes overwriting the current contents of the transfer buffer. A "copy" operation typically leaves the selected information unchanged in the source and only places a copy of the information in the transfer buffer. Additionally, in the destination UI, a "paste" or "insert" command may copy the contents of transfer buffer to a selected point in the destination document or file, leaving a copy in the transfer buffer for additional pastes or insertions.

In some computer programs, a "paste special", "import from clipboard", or similar command may be available with several conversion options to perform a minimal conversion process on each transfer. However, even though the user may be performing the same "paste special" command over and over, the typical UI does not memorize or "learn" this process, so the user is forced to respond to a number of redundant options and dialogs on each paste operation.

The same user interface conventions are followed by many computer systems not only for content or information within a computer resource such as text and graphics within a file, but also for resources (e.g. files, shortcuts, icons, mappings, etc.) within a computing environment (e.g. file system, directories, folders, etc.). For example, when working with a MS Windows™ operating system and running the Windows Explorer program, a user may select a file, directory or folder to move, execute an "Edit—Cut" command sequence, navigate to another directory or drive, and execute an "Edit—Paste" command to move the selected resource to the new destination. Similarly, by selecting the source resource, executing a copy command, and then executing a paste command to one or more destinations, the original resource is not changed but copies of it are deposited at the destination points. Further, by selecting and copying a source resource, then selecting a destination resource, replacement of the destination resource may be accomplished.

However, as source information may or may not be completely compatible with destination environment, the user, even when using the related invention, may be required to make certain tedious and inconvenient operations to perform the information transfer usefully.

For example, consider a situation where the source information is a graphically rich section of a web page, including text and color photographs. Further assume for the purposes of this example that the color photographs are stored in the source document as Joint Photographic Experts Group ("JPEG") format data objects. If the user attempts to transfer this selected information (e.g. text+photograph) to a destination which does not support JPEG photographs, such as a text-only editor, a problem may arise that cannot be completely handled by the related invention—e.g. what to do with the photograph. In some other cases, destination editor may be able to handle other format images, such as Graphic Interface File ("GIF") images, but not JPEG images.

The user may, after realizing this and with sufficient technical expertise, find a way to export the image and save it to a separate file, use another tool to convert the JPEG image to a GIF image, and then use the related invention to transfer the GIF image to the destination document. This process, however, requires the user to have the expertise necessary to make such an export and conversion, as well as to have the extra tool to perform the conversion. Further, if this is a task to be repeated often, such as cutting and pasting a considerable amount of information in this manner, it becomes tedious, tiresome, and error-prone.

Additionally, in some situations, it is desirable to translate the initial spoken language of the source to another spoken language. For example, if a user is creating a Spanish-language newspaper and desires to quote an source which is provided in English, the present day systems require the user to perform all of the cut-and-paste steps as just described, as well as to some how perform a language translation on the English source text. The translation can be performed manually, or the user may have to retype the English text into a translation program, select an option to translate the text to Spanish, and then retype or cut-and-paste the Spanish text into the desired destination file or document. To achieve a computer-assisted translation such as this, the user may use one of many well-known programs or online services, such as AltaVista's online BabelFish™ phrase translator. However, to use these existing tools, the user must treat the translation program (or web site) as yet another source and/or destination, and must perform many user operations to effect cutting and pasting from source to translator, and from translator to destination. If the user is translating several phrases several sources, and inserting the translated text into a plurality of destination points, this process can be very cumbersome and tedious.

Therefore, there existed a need in the art for a system and method to provide configurable automatic source-to-destination spoken language translation for transferring information from one or more source environments in one or more initial spoken language to one or more destination environments in a selected spoken language.

One of the related patent applications disclosed a solution for automatic translation of text during transfer between computer programs, but this related invention did not address embedded text or encoded text within a graphic file such as an image or icon.

For the purposes of this disclosure, we will define "encoded text" as text which is associated with a graphical object, but which is represented in a non-optical or non-visual form, such as the text which is part of common "vector graphics" images such as Windows Meta Files ("WMF"), PostScript™ data, Hewlett-Packard Graphic Language ("HPGL")™, Adobe Portable Document Format ("PDF")™, as well as various proprietary and other "open" graphics languages and formats. In each of these formats, some text strings are "encoded" by storing the text string along with descriptors regarding the font, size, color, effects (underline, bold, italics, etc.), and location of the text string. This text, with proper knowledge of the encoding format, can be extracted from the graphical object without the need for Optical Character Recognition.

For the purposes of this disclosure, we will define "embedded text" as text which is incorporated into a digital image, and which is not represented by "text data" (e.g. not encoded text), but is represented as digital images of text, such as bit maps which appear to be text to a user. Embedded text must be found within such a graphical object using human recognition, or through Optical Character Recognition techniques.

It is common vector graphics objects (PDF, WMF, HPGL, PostScript, etc.) to contain both embedded text and encoded text.

Often times, graphics on a web page or any source contains multiple embedded text phrases. By using an existing image editor, such as Adobe PhotoShop™, and a translation tool such as a translation dictionary, a user must perform several user operations to effect editing, cutting and pasting between source to editor, editor to translator, translator back to editor and finally editor to destination. In addition, if the user is translating multiple phrases several image sources, and inserting the translated text into a plurality of destination points, this process becomes very monotonous and tiresome.

For example, as shown in FIG. 8, a graphic file contains apparent text words within the image itself (80). The image file is typically digitized in various formats such as JPG, TIF, PNG, and BMP. These types of graphic files can be obtained from various sources such as web browsers, text editors or image editor programs. In this example image of a city library on a street corner, there are five locations or regions in which embedded text can be found.

(1) on the wall where there is a sign which denotes a "City Library" (81);
(2) on the wall where there is a sign showing a street address of "900 Main St." (82);
(3) on a pole, a street sign which reads "Main St." (83);
(4) on a left door which is marked "out" (84); and
(5) on a right door which is marked "in" (85).

This embedded, text, however, is not actually text data in the sense that it is comprised of regions of pixels which appear to a viewer to be text. Thus, using the presently available technology, an user wishing to transfer this image from an English document to a French document, for example, would have to perform the following general actions, each of which involve multiple steps:

(a) manually examine the image to find all of the embedded text;
(b) for each embedded text word or phrase, perform a natural language translation, such as translating "Main St." to "Rue Main";
(c) open the image file or object in an image editor such as Adobe PhotoShop™;
(d) perform multiple operations to replace or overlay the embedded text areas with the translated text words and phrases;
(e) export or save the modified image to an image file or object; and
(f) insert the modified image file or object into the new document.

These steps require several distinct skill sets, such as being capable of performing language translations and being capable of using an image editor program, and can be quite time consuming.

Similarly, to properly translate the encoded text portions of a graphical object, one would need to use an editor which is capable of editing the graphical object (e.g. a PostScript editor, a PDF editor, etc.), and would need to perform the NLS translation on the encoded text in order to produce a "translated" graphical object. Again, this requires expertise in several domains, including using the editor software as well as being literate in the two languages (e.g. the source NLS and the destination NLS).

Therefore, there is a need in the art for a system and method to provide configurable automatic source-to-destination spoken language translation for transferring information from one or more source environments in one or more initial spoken languages to one or more destination environments in a selected spoken language for embedded text and encoded text within graphic image files, elements and objects.

SUMMARY OF THE INVENTION

Text regions of natural language embedded in images are automatically translated via a clipboard buffer during a cut-and-paste command according to an isolation rule defining one or more types of image elements to be isolated, by examining the image elements, responsive to meeting the isolation rule, transferring the image element from the clipboard to an isolation store, disabling pasting of the image element; recognizing text within the isolated image; determining a natural language in which the recognized text is expressed; performing natural language translation of the recognized text into a user-specified destination natural language; producing image data for the translated text; overlaying the image data onto the embedded text in the isolated image element; and pasting the modified image element from the isolation store to a user-designated destination points within a destination computer file.

BRIEF DESCRIPTION OF THE DRAWINGS

The following detailed description when taken in conjunction with the figures presented herein provide a complete disclosure of the invention.

DESCRIPTION OF THE INVENTION

Figure 1:
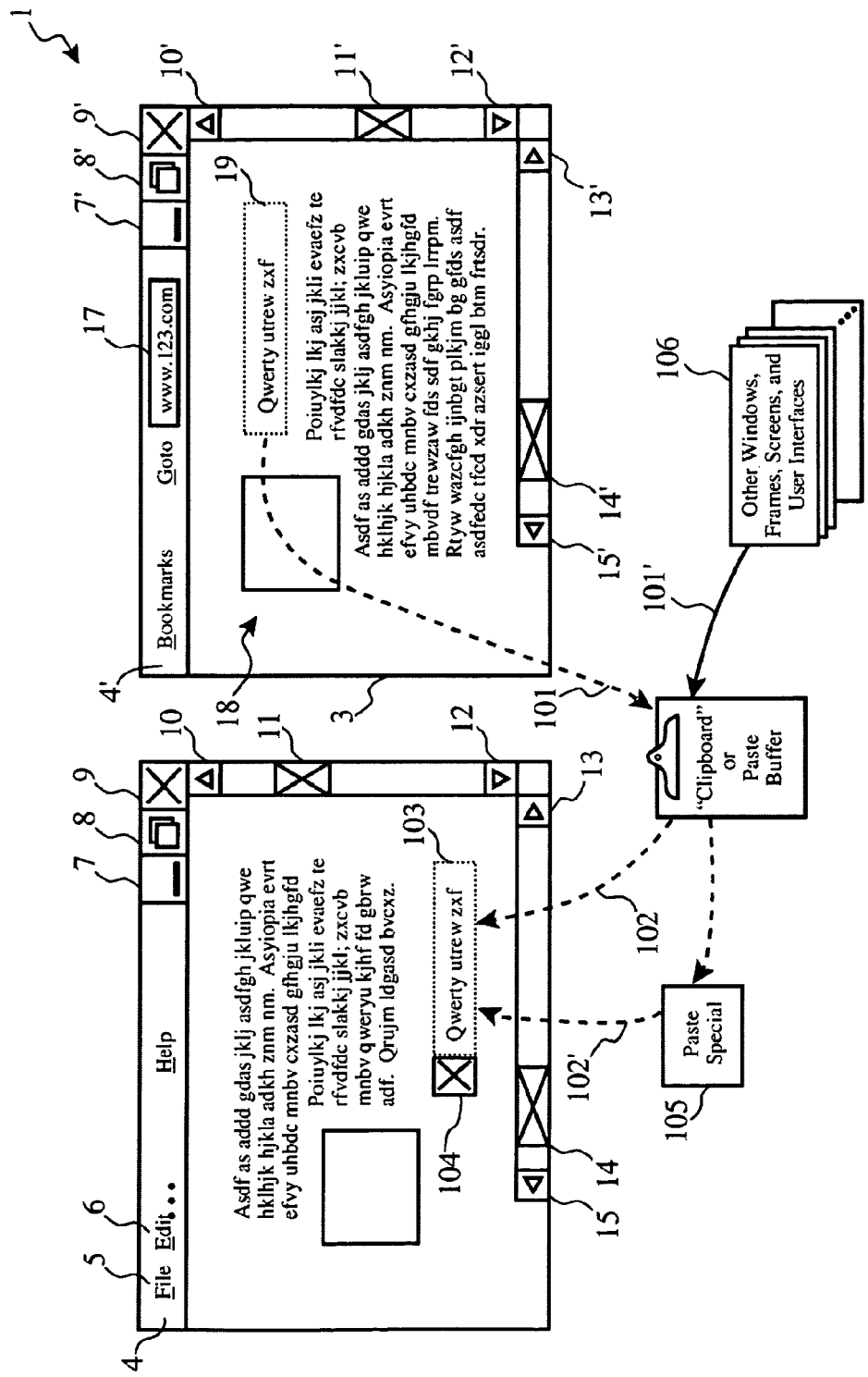
FIG. 1 illustrates the typical user interfaces and system actions of "cutting and pasting" information from one application program to another.
Figure 2:
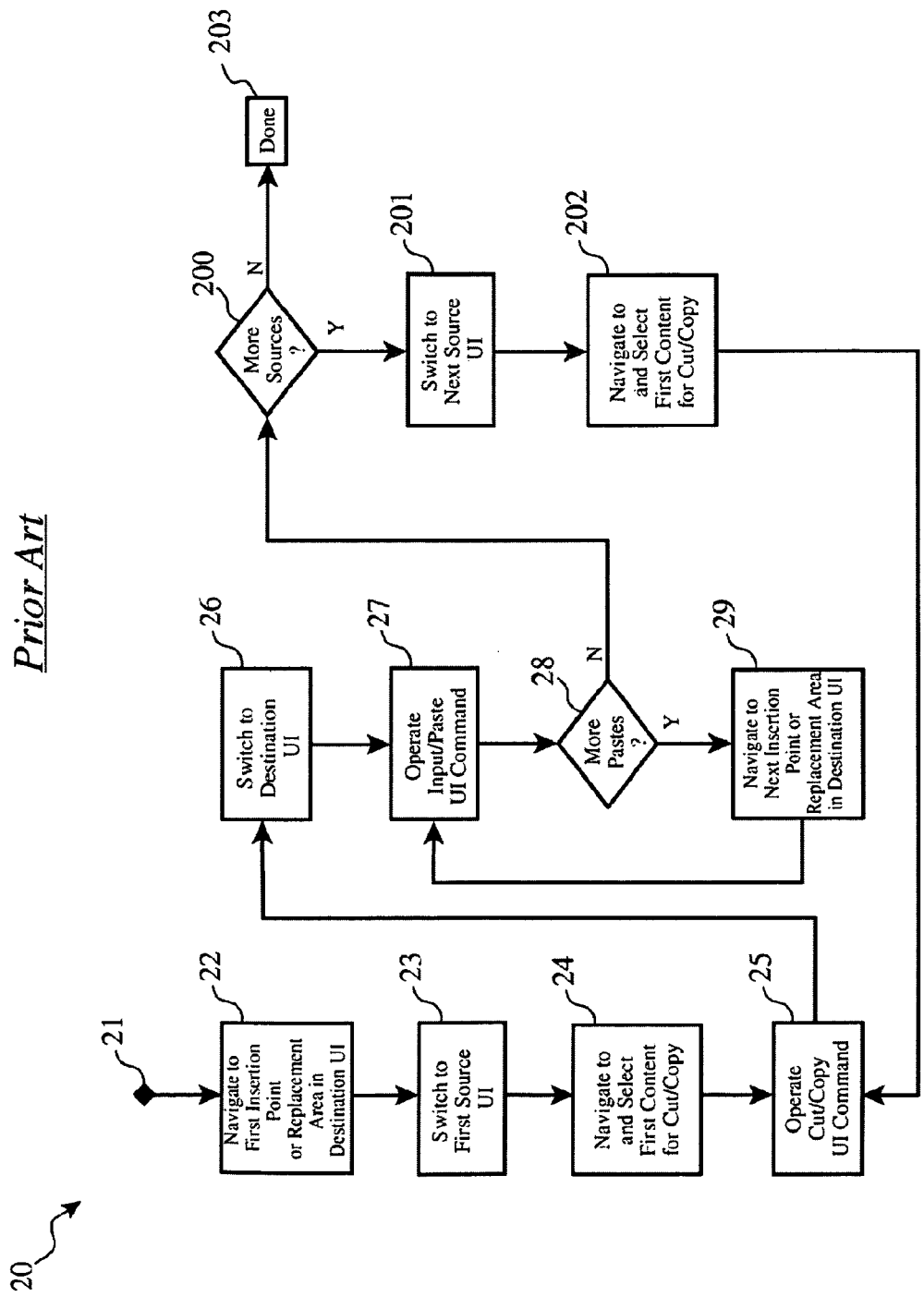
FIG. 2 shows the typical logical process in a general manner for transferring content from one application program or system function to another.

The present invention is preferably realized in conjunction with or as an extension of one or both of the systems and methods described in aforementioned related patent applications. However, it will be readily apparent to those skilled in the art that the present invention may be realized as software or hardware product independently of these related inventions, as well.

Throughout our disclosure, we will utilize the terms "spoken language" and NLS synonymously. The acronym NLS has varying representation based upon the defining source, but generally relates to spoken and written human-readable language. For example, some sources define NLS as "natural language system", such as a voice recognition system which recognizes free speech phrases. IBM and Microsoft define the acronym NLS as "national language support", which encompasses an array of computing system options to adapt the system to geographically local spoken languages, including such options as selection of a default character set, keyboard layout, etc. As such, we will utilize the acronym NLS to indicate a human-spoken or human-written language (e.g. English, Spanish, Japanese, Farsi, etc.), as opposed to a binary or computer-related language or format (e.g. not "C", Java, JPEG, HTML, etc.). Further, throughout our disclosure, we will refer to conversion of information from one spoken language to another spoken language as "translation".

SUMMARY OF THE RELATED INVENTIONS

According to one aspect of the first related invention, the user initially designates one or more insertion points or replacement areas for receiving transferred content in a destination UI, then switches to a source UI, highlights content to be transferred, and the system performs the copy or paste operation without any additional user action, including any conversion as may be necessary.

Then, the user may simply navigate to another point in the same source, or switch to another source UI, select content, and it will be "pasted" automatically into the destination without the user having to switch back to the destination UI or perform any additional paste or insert command actions.

According to an aspect of the second related invention, users are enabled to preselect or pre-designate one or more destination content area(s) or points, and then to only perform the highlighting action in the source files or documents to produce copy/paste results without any additional mouse clicks or touching the keyboard. Additionally, the second related invention automatically intercepts the transfer of the information to the destination, detects information digital compatibility during information transfer (e.g. during a "pasting from buffer" operation"), determining if the information is compatible with the destination document, environment, or data construct. If the information is not compatible, the transfer is suspended, and the user is provided an opportunity to define a new rule, process, or macro regarding how to handle the incompatible information. Options include invoking a converter or translator, if one is available on the present system. Another option is to export the incompatible information to a separate data construct such as a separate file, and to provide a note or annotation in the destination file as to the removal of the information and its final location.

Suitable Computing Platforms

The related inventions as well as the present invention are realized in one available embodiment as computer-executable code such as compiled software, scripts, or portable programs, in conjunction with existing application programs, operating systems, and computer hardware. For purposes of completeness, we first present a generalized view in FIGS. 3 and 4 of typical computer hardware and software which is suitable for realization of our invention. Many variations of these computer platform details may be made without departing from the scope of the invention, as will be readily recognized by those skilled in the art.

Common computing platforms such as personal computers, web servers, and web browsers, as well as proprietary computing platforms, may be used in realization of the present invention. These common computing platforms can include, but are not limited to, personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 3:
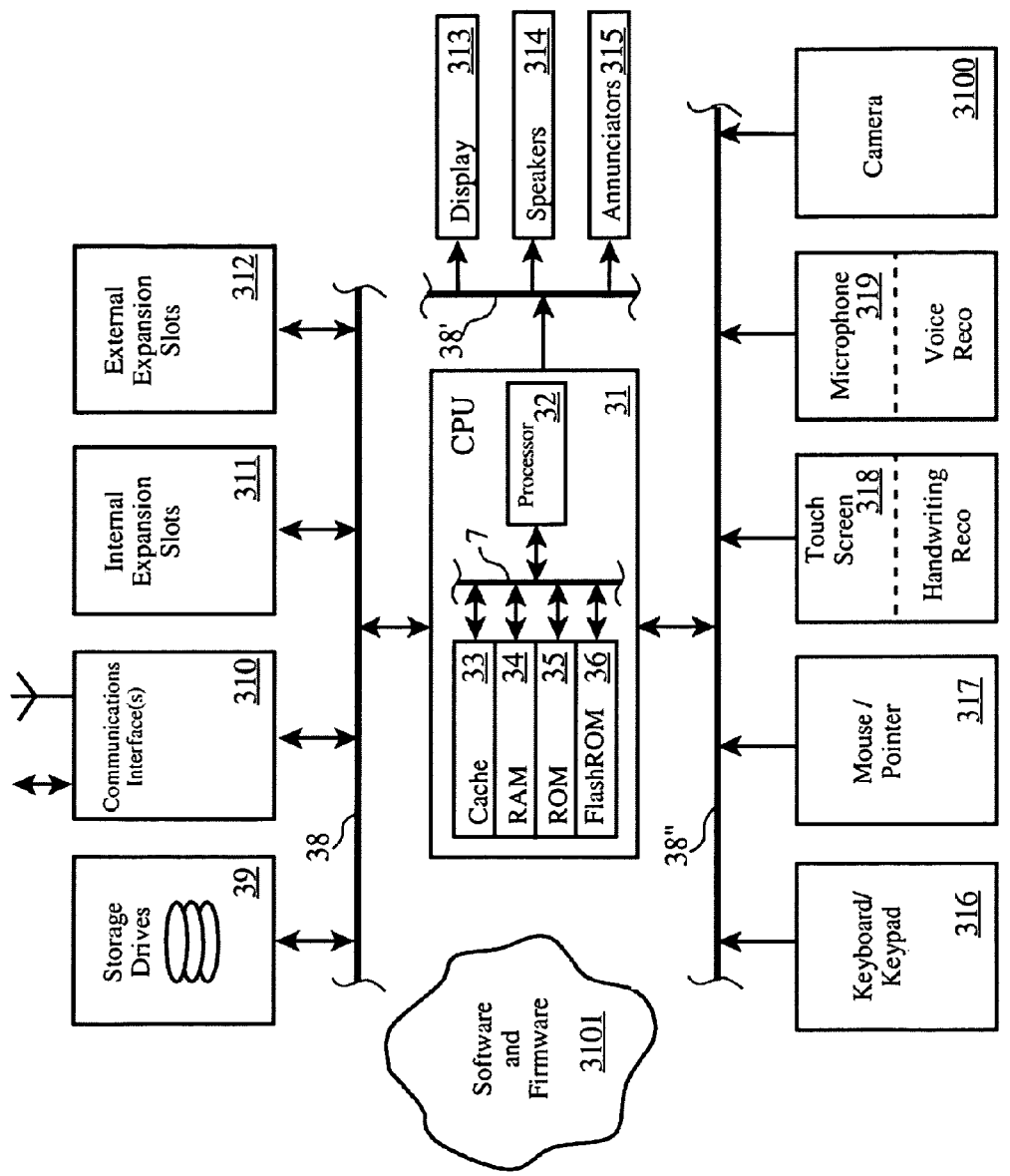
FIG. 3 depicts a generalized computing platform architecture, such as a personal computer, server computer, personal digital assistant, web-enabled wireless telephone, or other processor-based device.

Turning to FIG. 3, in a related invention, a generalized architecture is presented including a central processing unit (31) ("CPU"), which is typically comprised of a microprocessor (32) associated with random access memory ("RAM") (34) and read-only memory ("ROM") (35). Often, the CPU (31) is also provided with cache memory (33) and programmable FlashROM (36). The interface (37) between the microprocessor (32) and the various types of CPU memory is often referred to as a local bus, but also may be a more generic or industry standard bus.

Many computing platforms are also provided with one or more storage drives (39), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (310), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (311), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (312) allowing the user the ability to easily install and remove hardware expansion devices, such as PCMCIA cards, SmartMedia cards, and various proprietary modules such as removable hard drives, CD drives, and floppy drives.

Often, the storage drives (39), communication interfaces (310), internal expansion slots (311) and external expansion slots (312) are interconnected with the CPU (31) via a standard or industry open bus architecture (38), such as ISA, EISA, or PCI. In many cases, the bus (38) may be of a proprietary design.

A computing platform is usually provided with one or more user input devices, such as a keyboard or a keypad (316), and mouse or pointer device (317), and/or a touch-screen display (318). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (318) is usually provided, often with handwriting recognition capabilities.

Additionally, a microphone (319), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (3100), such as a still digital camera or full motion video digital camera.

One or more user output devices, such as a display (313), are also provided with most computing platforms. The display (313) may take many forms, including a Cathode Ray Tube ("CRT"), a Thin Flat Transistor ("TFT") array, or a simple set of light emitting diodes ("LED") or liquid crystal display ("LCD") indicators.

One or more speakers (314) and/or annunciators (315) are often associated with computing platforms, too. The speakers (314) may be used to reproduce audio and music, such as the speaker of a wireless telephone or the speakers of a personal computer. Annunciators (315) may take the form of simple beep emitters or buzzers, commonly found on certain devices such as PDAs and PIMs.

These user input and output devices may be directly interconnected (38', 38") to the CPU (31) via a proprietary bus structure and/or interfaces, or they may be interconnected through one or more industry open buses such as ISA, EISA, PCI, etc.

The computing platform is also provided with one or more software and firmware (3101) programs to implement the desired functionality of the computing platforms.

Figure 4:
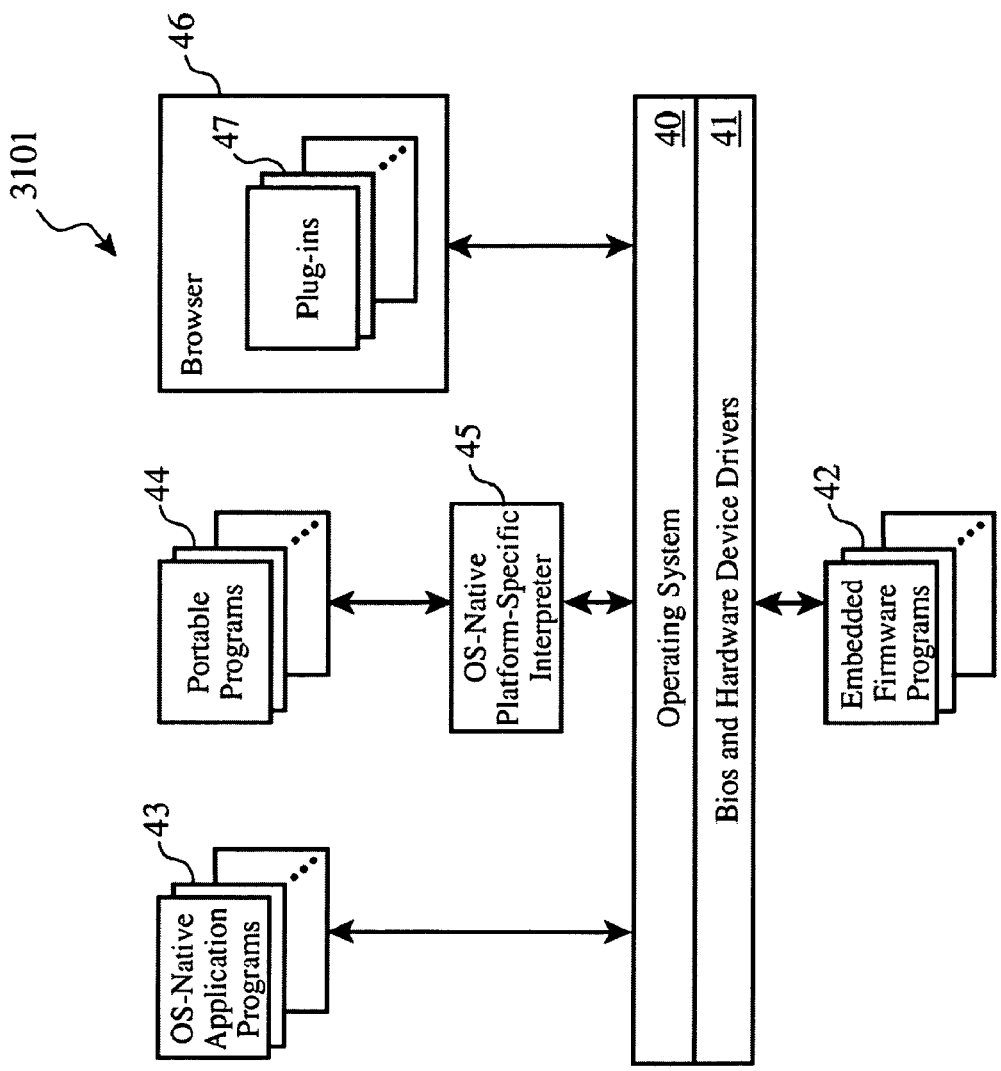
FIG. 4 shows a generalized organization of software and firmware associated with the generalized architecture of FIG. 1.

Turning to now FIG. 4, more detail is given of a generalized organization of software and firmware (3101) on this range of computing platforms. One or more operating system ("OS") native application programs (43) may be provided on the computing platform, such as word processors, spreadsheets, contact management utilities, address book, calendar, email client, presentation, financial and bookkeeping programs.

Additionally, one or more "portable" or device-independent programs (44) may be provided, which must be interpreted by an OS-native platform-specific interpreter (45), such as Java™ scripts and programs.

Often, computing platforms are also provided with a form of web browser or microbrowser (46), which may also include one or more extensions to the browser such as browser plug-ins (47).

The computing device is often provided with an operating system (40), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (41) are often provided to allow the operating system (40) and programs to interface to and control the specific hardware functions provided with the computing platform.

Additionally, one or more embedded firmware programs (42) are commonly provided with many computing platforms, which are executed by onboard or "embedded" microprocessors as part of the peripheral device, such as a micro controller or a hard drive, a communication processor, network interface card, or sound or graphics card.

As such, FIGS. 3 and 4 describe in a general sense the various hardware components, software and firmware programs of a wide variety of computing platforms, including but not limited to personal computers, PDAs, PIMs, web-enabled telephones, and other appliances such as WebTV™ units.

Logical Processes of the Related Inventions

We now turn our attention to disclosures of the related inventions relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

In general, the related invention provides the user the ability to follow this process:
1. Declare destination content area for pasting or insertion in a destination UI;
2. Enable highlighting or selecting content to automatic copy selected information and store it in memory (e.g. buffer/clipboard) for future usage, as well as to automatically insert or paste the selected information into the pre-designated destination area;
3. Switch to source UI's, and simply highlight or select the desired content portion(s) which triggers dynamic insertion/concatenation into the declared content field.
4. Receive an automatic notification that a portion of the highlighted source information is not written in the same spoken language as the desired spoken language of the destination; and
5. Define new rule or process for handling the content to be translated such that future similar situations are handled automatically according to the user's preferences.

Using the related invention, advantages over presently available methods and user interfaces are:
1. User-friendly: the invention utilizes maneuvering techniques with which users are already familiar, such as double mouse clicks, dragging to highlight, etc.;
2. Convenient: the invention provides a user a new way of selecting destination for paste operations, and offers a quicker way of copy/paste by eliminating keyboard strokes, mouse clicks, navigation and toggling between different program windows and UI's.
3. Intuitive: Users can learn or "discover" that in this new mode, content highlighting triggers copy/paste effortlessly, immediately seeing the results of the highlighting action, and proceeding to experiment with various ways of applying and exploring this invention.
4. Time-Saving: Reduces time to compile information from multiple sources by making copy-paste user interface methods much more efficient.
5. Increases productivity: By reducing fatigue and tediousness in application program user interfaces, users are allowed to produce more accurate results with less effort in less time.

Figure 5:
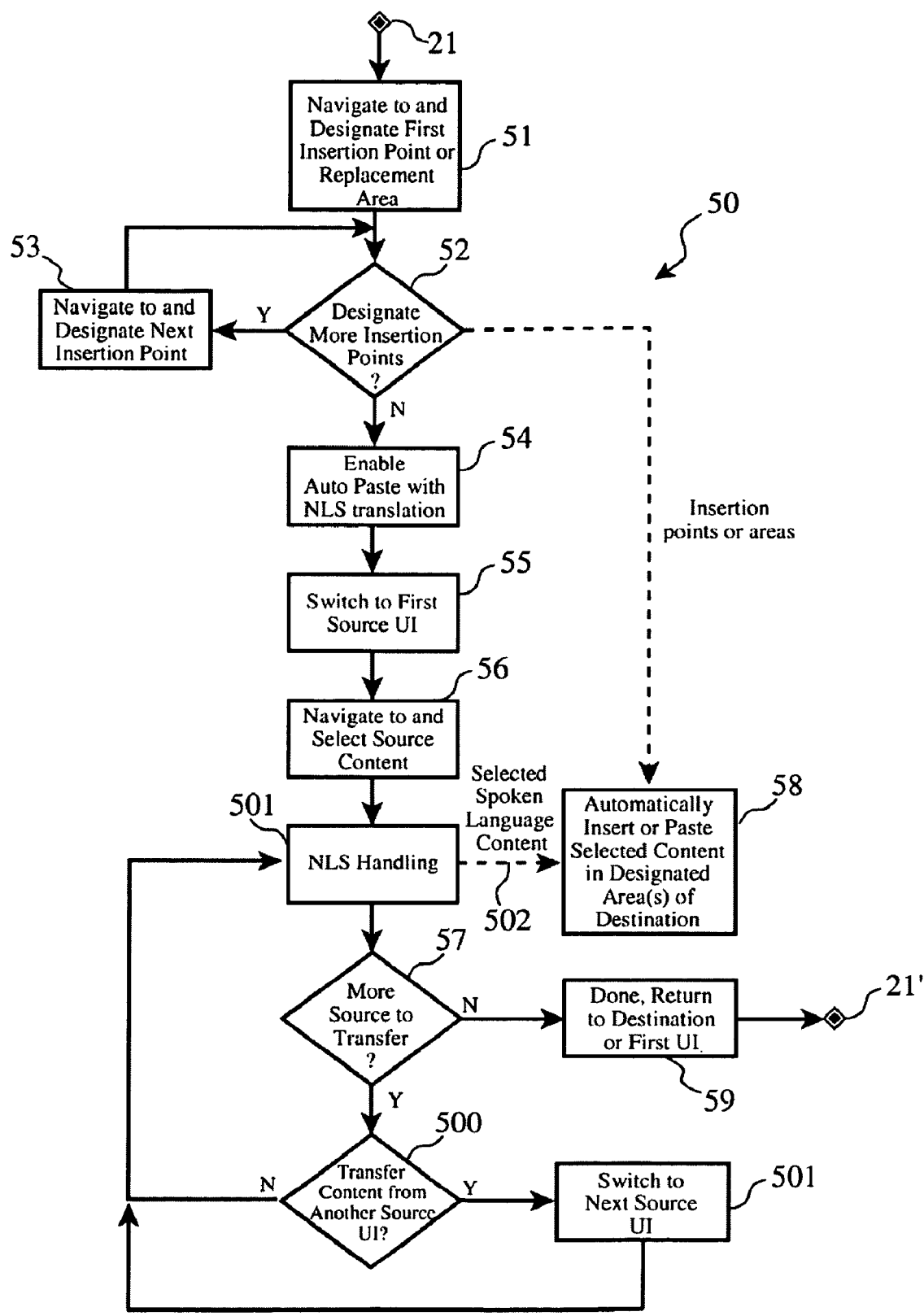
FIG. 5 illustrates the logical method of the present invention.

Turning to FIG. 5, a first logical process of the invention is shown at a high level. This method may be implemented as compiled code, scripts, or interpretable code (e.g. Java, applets, servlets, etc.) in full or part within application programs, operating systems, server suites, utility programs, or proprietary code or hardware.

While (21) creating or editing a computer resource such as a computer file or document, when a user wishes to insert or copy content from a source destination to the resource being edited, the shown method (50) may be employed. The source or sources may include points and areas within UI's of other programs and system functions, as well as within the destination resource which is being created or edited.

Initially, the user may navigate (51) to a first insertion point and optionally highlight an insertion area to designate a first "paste" destination while in the current (destination) UI. If (52) more than one insertion points or areas are desired, the user may navigate to and select (53) additional destinations while still in the destination UI. Insertion points can be marked in a variety of ways, including placement of a graphical icon such as a caret ("^") at the insertion point(s) or other suitable icon. Replacement destination areas can be marked in a variety of ways, including highlighting the selected text, graphics, information, or content in a special pattern, color, or both, or by making special changes to the selected information itself (e.g. changing the text to a different color, underlining the text, etc.). Preferably, a user interface or dialog box is also provided to allow the user to manage destination insertion points and replacement areas, such as to create additional points and areas, and to remove points and areas.

When all destination points and areas have been designated, the user enables (54) the automatic content transfer function of the invention through an appropriate user control such as right-clicking with the mouse to bring up a dialog box, selecting an option from a drop-down list, or operating a special icon, key or key sequence. According to the present invention, the user is allowed to select advanced options, such as rules for concatenation or content conversion, or whether cutting (e.g. source deletion) is performed as well as copying on each subsequent selection operation, as well as designating a spoken language for the destination(s). For example, the user may specify that the destinations which were previously designated (52) are to receive Spanish content only.

Next, the user switches (55) to the first source UI from which information is to be transferred, navigates to the first source point, and highlights or selects (56) source content.

NLS handling is performed (501), described in more detail in the following paragraphs, and the information which is expressed in the user-selected natural language is then automatically copied into the transfer buffer, and subsequently pasted (58) into the designated destination point(s) and area(s), without need to switch back to the destination UI.

If (57) more source content is to be transferred, the user may continue to navigate to additional points and to select (56) additional content for automatic pasting into the destination resource from within the current UI, or the user may switch (500, 501) to another UI and proceed with selecting (56) for automatic pasting (58) into the destination resource.

If the concatenation option is selected, upon selection of a content block or area, it is appended to the existing contents of the transfer buffer, and the user is given the option to perform the automatic pasting into the destination point(s) and area(s), without need to switch back to the destination UI.

If the source cutting operation is selected, upon selection of a content block or area, it is deleted from the source resource (assuming the user has the rights to modify the resource), placed in the transfer buffer, and pasted, concatenated or converted as determined by the other options.

When (57) all source information has been copied, the information transfer operation is complete (59), and the user returns to the initial (e.g. destination) UI to continue editing or creating (21') the computer resource.

As an example and comparison now between the user control method typically employed and the user control method provided by the present invention, we present the following case. On a MS Windows™ operating system, a user who has several windows opened intends to compose an email in Spanish using a web based mail program. Further, the user plans to generate the content of this email from his or her other open windows by using the copy/paste functions, specifically from Microsoft Word™ word processor and from Lotus Notes™ application programs.

For this example, suppose that the email message is to be created from an English paragraph in MS Word™, and from a French paragraph in Lotus Notes™. Also, presume that the online phrase translator BabelFish™ by AltaVista™ is to be used to provide the English to Spanish and the French to Spanish translations. So, traditionally what the user would be required to do in order to accomplish this task in the shortest time frame is the following:

1. open the email composer window;
2. switch to the window for MS Word™ using Alt-Tab;
3. highlight the desired English text in the MS Word™ document;
4. hit Ctrl-C to copy the selected text into the clipboard;
5. hit Alt-Tab until toggle to the BabelFish™ translator program window;
6. click on the text area or entry point wherein the source language paragraph is to be entered;
7. select English-to-Spanish as translator function;
8. highlight the produced Spanish translation in the translator UI;
9. hit Ctrl-C to copy the selected Spanish text into the clipboard;
10. hit Alt-Tab until toggle to the email composer window;
11. click on the text area or point where the translated paragraph is to be placed;
12. hit Ctrl-V or select Edit-Paste to insert the Spanish text copied from MS Word™ and translated by the BabelFish™ web service;
13. switch to the Lotus Notes™ window using Alt-Tab;
14. highlight or select the desired French text in Notes™;
15. hit Ctrl-C to copy the text to the clipboard;
16. hit Alt-Tab until toggle to the BabelFish™ translator program window;
17. click on the text area or entry point wherein the source language paragraph is to be entered;
18. select French-to-Spanish as translator function;
19. highlight the produced Spanish translation in the translator UI;
20. hit Ctrl-C to copy the selected Spanish text into the clipboard;
21. hit Alt-Tab to switch back to the email composer window;
22. place the cursor on the end of the first inserted paragraph; and
23. hit Ctrl-V or select Edit-Paste with the mouse or keyboard to append the Spanish text from the Notes window (and translated by BabelFish™) to the initially inserted Spanish content.

As this illustration shows, just combining two pieces of information from two sources into one destination and performing translations on the information can take 23 user steps or more using the existing processes.

Using this invention, however, this process is shortened significantly to achieve identical result without ever having to touch the keyboard:

1. open the email composer window, place cursor at desired insertion point;
2. enable auto-pasting and designate an insertion point or replacement area (e.g. by right clicking in the email text area or by double clicking on the left mouse button while in the email message text area), selecting an auto-paste option (assume no concatenation, no conversion and cutting options are selected) and select Spanish as the desired destination spoken language;
3. switch to the MS Word™ window using Alt-Tab;
4. highlight the first block of desired English text causing the selected text to be automatically translated to Spanish and inserted in the email composer window at the designated destination point;
5. switch to the Lotus Notes™ window using Alt-Tab;
6. highlight the block desired French text causing the selected text to be automatically translated to Spanish and inserted in the email composer window following the first block; and
7. switch back to the email composer window using Alt-Tab.

There are alternative implementations available to declare destination context area. For example, consider the situation where the email message is created from many windows or many sections of a few windows, the number of toggles between program windows and highlighting/Ctrl-C/Ctrl-V operations could cause intense frustration and stress on the user. In systems running operating system which are not completely stable, such window or frame switching may also increase the possibility of an OS lock up or crash.

Similar to the email example, this related invention can be used by helpdesk agents filling out problem descriptions from known issues or solutions, users completing a form based on known information (creating resume, registration, etc.), and even programmer and software testers attempting to write new code or test cases by using a template or reusing available code.

There are plentiful situations where an efficient way of copying content and inserting it into one or more desired locations can significantly improve productivity, save time, reduce overall operational cost, and radically increase user satisfaction.

In an alternate embodiment of the related invention, each selection of source content may be followed by addition of a specified delimiter between the next selection of source content. For example, in the email composition scenario previously discussed, a delimiter such as a space, carriage return, HTML horizontal line, or text note may be automatically added between the MS Word paragraph and the Lotus Notes paragraph. In a first advanced implementation of this option, a descriptive annotation may be appended before or after the content, such as:

<copied from MS Word: c:\my_files\document.doc , translated from English to Spanish> and:

<copied from Lotus Notes: e:\network_backups\advice.lwp , translated from French to Spanish>

These notations can include web site addresses, as well, and optionally time and date information:

<copied from www.help.ibm.com\laptops\upgrades on 3-15-2003>

Alternate embodiments of this notation include, but are not limited to, annotations made in eXtensible Markup Language ("XML"), and possibly including a time stamp such as a local clock and calendar value, or a Coordinated Universal Time ("UTC") value.

According to another alternative aspect of the related invention, the destination areas and points may be saved in association with a computer resource (e.g. a specific file), or as a named template. These insertion points and areas can then be recalled so that new information from multiple sources can be quickly and routinely compiled. This function is particularly useful for creating news letters, status reports, and the like.

As will be recognized by those skilled in the art, the use of text as the content copied from a source to a destination in the foregoing examples is not meant to imply that the present invention is limited to such content types. In fact, it may be used to transfer content of any format which is compatible with the transfer buffer implementation. For example, video clips, graphics, hyperlinks, audio clips, and the like may be handled by the invention provided that the transfer buffer is implemented in a manner compatible with storing such information. According to one optional implementation detail, the user may define a NLS handling rule which isolates certain types of content for later review, such as a isolating pictures for later review to see if they should be exchanged for alternate pictures more suitable for the destination language and culture.

Another desirable but not critical aspect of the related invention is to provide an "undo" function, with or without an action log. By keeping track of the source to destination transfers, and especially the source deletions when "cutting" is selected, the user may reverse any operation previously made. The tracking record of actions taken can preferably be produced in a human readable form, which is useful in version tracking, revision control, and similar activities.

NLS Handling

Figure 6:
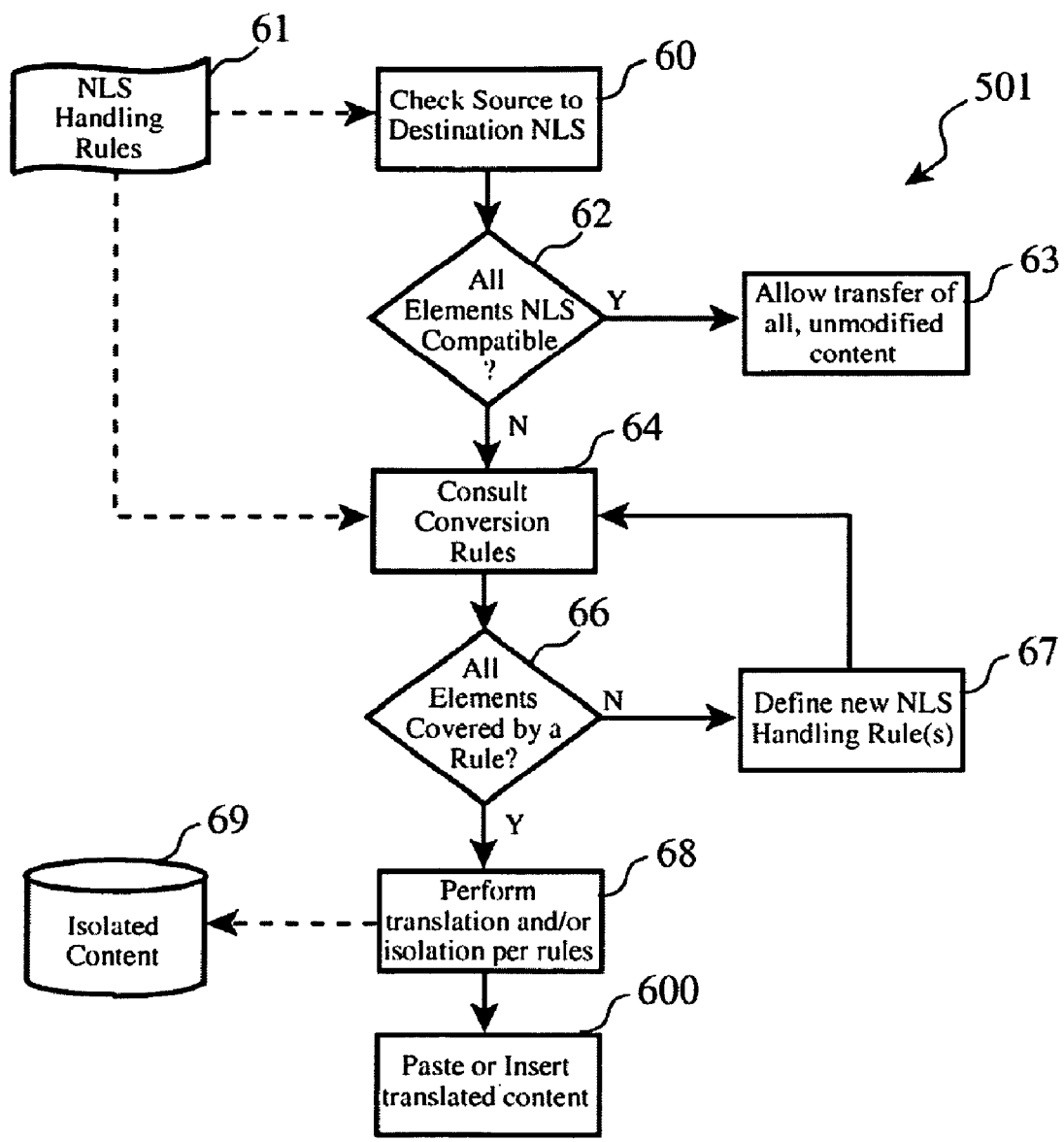
FIG. 6 depicts details of the logical process of translating transferred elements of information from a source NLS to a destination NLS for text elements, as described in a related patent application.

Turning to FIG. 6, details of NLS handling (501) according to the related invention are shown. A set of NLS handling rules (61), if already defined, are consulted initially to determine (60) if all the elements of the selected source content are in the same spoken language as the user-select spoken language of the destination(s). Alternatively, the spoken language of the destination may be automatically determined by examining the words and phrases which may already exist in the destination, and comparing them to a dictionary to match them to a spoken language. This same method may be employed to automatically determine the spoken language of each source information element selected for transfer.

For example, Table 1 shows a basic set of NLS handling rules which can be implemented in a text file for a particular hypothetical destination document editor called "JotPro". Additionally, assume a hypothetical translator program or service called "QuickXlate" is available to be called or invoked on supplied text strings to perform a spoken language translation.

TABLE 1

Example "JotPro" NLS Handling Rules

```
<NLS_handling_rules>
    <destination> Jotpro </destination>
    <destination_versions> all </destination_versions>
    <text_translation_rules>
        <translate_rule>
            <source_lang> English </source_lang>
            <destination_lang> Spanish </destination_lang>
            <translator> QuickXlate </translator>
        </translate_rule>
        <translate_rule>
            <source_lang> French </source_lang>
            <destination_lang> Spanish </destination_lang>
            <translator> QuickXlate </translator>
```

TABLE 1-continued

Example "JotPro" NLS Handling Rules

```
        </translate_rule>
    <text_translation_rules>
    <isolation_rules>
        <isolate_types> pcx, gif, tif, tiff, jpg, jpeg </isolate_types>
    </isolation_rules>
</NLS_handling_rules>
```

Table 1 is expressed in a markup-style language, such as eXtensible Markup Language ("XML"). Other formats and language are available to implement such as set of compatibility rules, including but not limited to plain text, macro languages, tables, databases, etc. It defines that source in English or French which needs to be translated into Spanish is to be handled by the "QuickXlate" program or service, and that graphics elements of the types Microsoft Paintbrush (PCX), Graphic Interchange format (GIF), Tagged Information Format (TIF, TIFF), and Joint Photographic Experts Group (JPG, JPEG) format are to be isolated for later review by the user.

So, each element (e.g. paragraph or sentence of text, graphic image, video clip, audio clip, animation, etc.) is checked (60) against the set of NLS handling rules (61), and if an element needs to be translated, it is marked for translation. If (62) all elements are already in the desired destination spoken language, then transfer of the unmodified source content (all elements) is allowed (63).

For each element to be translated (or isolated), the translation function is performed according to the appropriate handling rule, such as invoking a translator program, DLL, web service, etc., using an application programming interface (API) call, or other suitable means to invoke an existing translator process or program. There are a number of available protocols for invoking remote services such as a Common Object Request Broker Architecture ("CORBA"), Simple Object Access Protocol ("SOAP"), and many ways to transmit the data representing the phrase to be translated and the translated phrase such as eXtensible Markup Language ("XML") over hyper text transfer protocol ("HTTP"). Lingua Translator Service via SOAP and XML is one such online translator service. Another such service is provided by PROMT Ltd. of St. Petersburg, Russia.

If (66) no applicable rule for an element is found in the NLS handling rules (61), then a user interface is preferably invoked to allow the user to define a new rule or action for handling the elements of that type. When NLS handling rules for all incompatible elements have been found or defined, the translations performed (68).

Isolation is a special type of NLS handling which allows certain types of elements to be "separated" from the source content and stored in a separate data construct, such as a file on the system hard drive, or a file in system memory. In the context of NLS handling, some element types such as pictures, clip art, audio, music, etc., may need to be exchanged for more appropriate types according to the destination spoken language or culture. For example, a source image of the Eifel Tower in Paris may need to be exchanged for an image of Madrid if creating a document intended for viewing in Spain.

Figure 7:
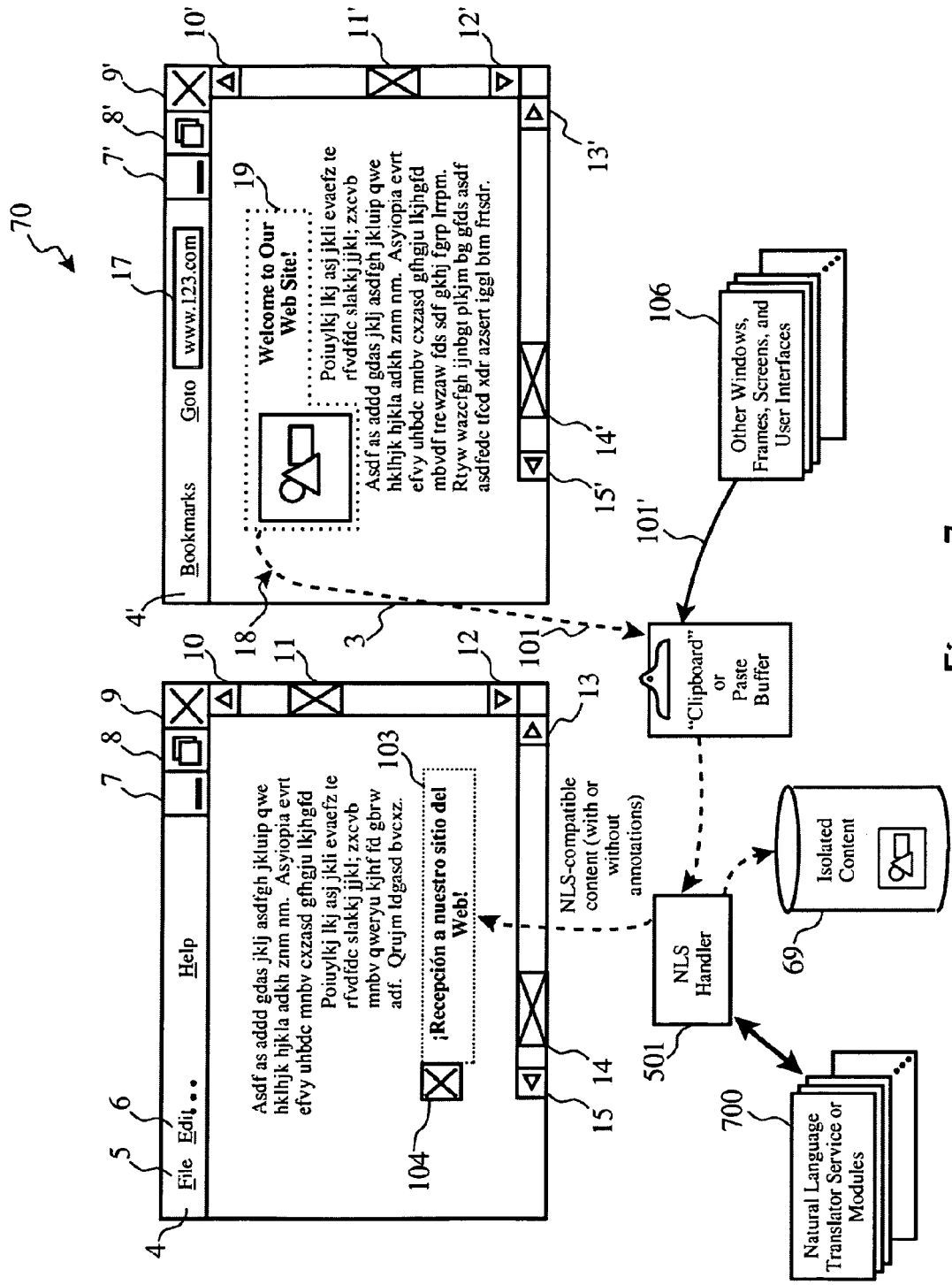
FIG. 7 provides a functional diagram illustrating the translation of information elements, and optionally the isolation of elements which are not translated, especially for text elements, as described in a related patent application.

Turning to FIG. 7, the isolation process of the related invention is shown as well as the process of invoking one or more translators according to the present invention. In this example, the English text "Welcome to Our Web Site!" as well as a graphic image (shown as the circle, triangle, rectangle combination) have been selected (19) for transfer (18) from a first UI. In this example, the NLS Handler (501) has been configured to intercept the insertion of the English phrase, and to translate it to Spanish using one or more translator services (700) before inserting it into a designated point (103) in a destination UI. Additionally, in this example, the selected image is isolated to an isolated content store (69) for later review and possible exchange with a more appropriate image. Selected and copied elements from other program UI's (106) also may be automatically translated or isolated similarly.

Logical Processes of the Present Invention

According to the present invention, a selected image does not have to be isolated, as provided by the related inventions, but may also be automatically handled and "translated" to a destination NLS.

Returning to FIG. 8 which was briefly discussed in the Background of the Invention, an example of a graphic image is shown which contains embedded text words within the file itself (80). This text words and phrases shown in the image may be embedded text (e.g. pixelated images of text), encoded text, or both, which give the visual appearance of text when displayed. The graphic image file or object may be digitized in any one of many known formats, such as JPG, TIF, PNG, BMP, WMF, HPGL, PostScript, PDF, or may be in a proprietary format. Additionally, the image may be originally conveyed in an "analog" format, such as one or more frames of NTSC, PAL or SECAM video signals. These types of graphic files are often used in various sources such as web pages, document editors, and the like. In this example image of a city library on a street corner, there are five locations or image regions in which embedded text or encoded text can be found:

(1) on the wall where there is a sign which denotes a "City Library" (81);
(2) on the wall where there is a sign showing a street address of "900 Main St." (82);
(3) on a pole, a street sign which reads "Main St." (83);
(4) on a left door which is marked "out" (84); and
(5) on a right door which is marked "in" (85).

Figure 9:
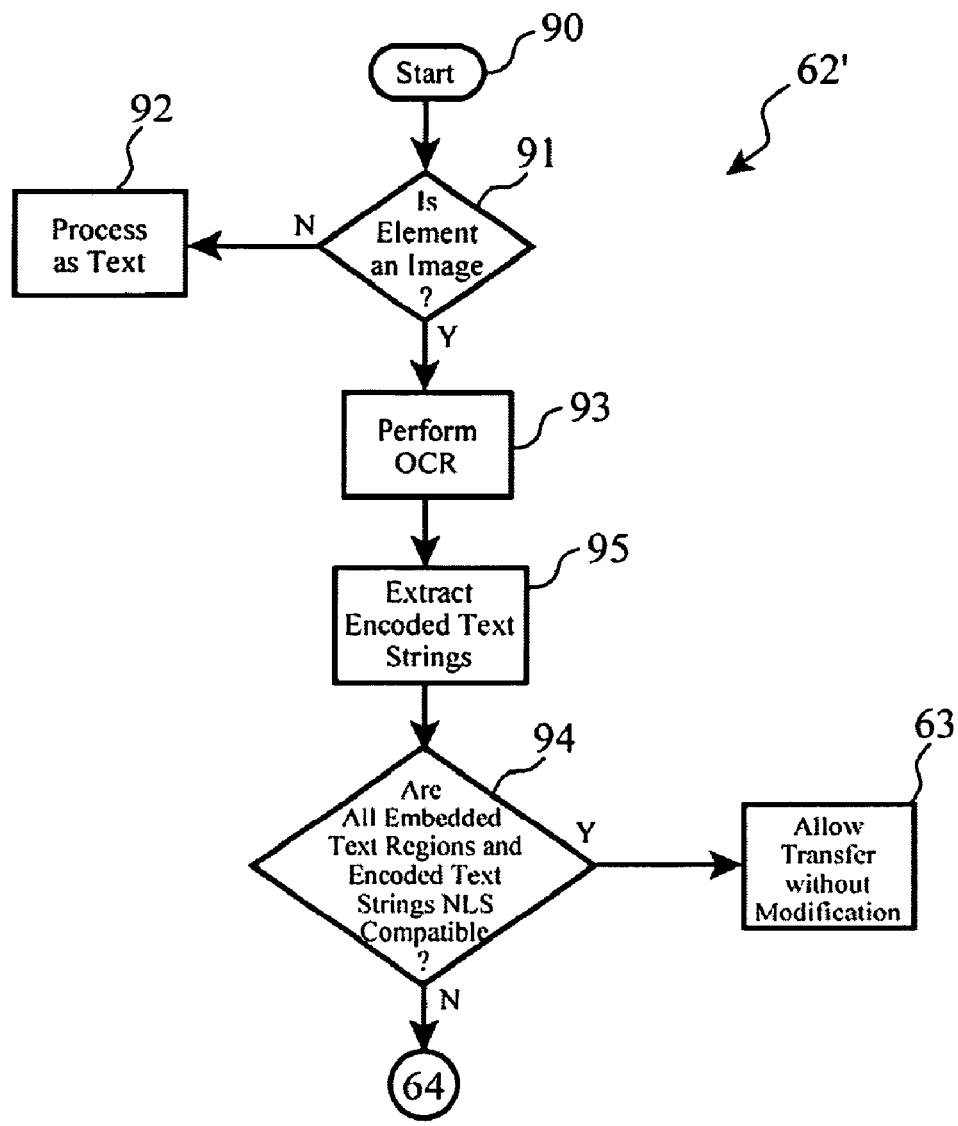
FIG. 9 shows our generalized logical process that enables the embedded or encoded text of a graphic element being transferred to be read, translated and displayed in the desired destination.

According to one aspect of the present invention, Optical Character Recognition ("OCR") (93) is employed to find and recognize areas of the overall image which contain embedded text, as shown in FIG. 9. According to another aspect of the present invention, encoded text is extracted (95) from graphical elements. In our logical process (62') is preferrably implemented as an extension or addition to the logical process of FIG. 6, but may be implemented independently of the related invention in alternate embodiments.

Once the graphical element (e.g. an image file or object) is read, received or input (90), the system first checks (91) whether the element is an image or graphical element, or not. If not, the system will follow the conversion process described in the related patent applications to process the element as text (92) or isolate the element for human handling.

However, if the element is an image file or object, then an OCR process is invoked (93), which finds regions of the image which contain digitized or pixelated embedded text, and converts those regions to text data such as ASCII text codes. If the image element is of a type which may contain encoded text, such as a WMF object, the system will extract the OCR methods and program products are readily available in the art, any number of which are suitable for use to realize the present invention. Output from these OCR programs typically include text data (e.g. ASCII, ANSI or Unicode strings) associated with x-y location coordinates for where each string is located in the image. Additionally, some OCR program products are capable of identifying a font type, color, and special marking (e.g. underline, italics, etc.) for each region of embedded text.

If the image file or object is of a format known to possibly include encoded text, such as an WMF, PDF, or HPGL object, the proper protocol for that file format is used to extract (95) any encoded text strings which are associated with the image file or object. This extracted text is also of a binary format such as ASCII, Unicode, ANSI, or other standard text encoding format.

Next, a check (94) is made to determine if every region is currently in a natural language compatible with the desired destination language. This check can be done using several methods, two of which include: (a) looking for characters which are not part of the destination alphabet or character set, and (b) comparing each word in each region to a dictionary of known words in the destination language. For example, if the destination language is French, a German character ü ("u" with umlaut mark) being found in a text region would indicate that this region is not in a compatible NLS language and needs to be translated as the ü character is not part of the normal French alphabet. Conversely, if the destination language is German, and character "c" is found with a cedilla diacritic mark (e.g. character ç) is found in the source image, it would be determined that the image needs to be processed as the ç character is not part of the normal German alphabet. The cedilla diacritic mark is used in the Latin alphabet and the Latin-derived languages, such as French.

In another example, if the destination language is French and the word "impossible" is recognized in the source image, this word would be found in the system's English dictionary but not in the system's French dictionary.

According to another embodiment of the present invention, a set of system alphabets and dictionaries are utilized to identify the source NLS of the text, which can then be used to select appropriate translation program(s) in subsequent steps of our process. For example, the word "impossible" would not be found in a French dictionary, so a search of German, English, Spanish and Italian dictionaries would yield a hit only in the English dictionary, and thus the source language would be identified as English. A similar analysis can be used based upon language-specific characters, too. Optionally, the image or OCR'd text can be displayed to a user who can identify the NLS in which it is expressed.

If all embedded text regions and/or encoded text strings of the image object are compatible with the destination NLS (94), then the image is transferred to the destination file, object, etc., without modification (63). Otherwise, the incompatible regions will be processed (64) to translate the embedded text regions.

Figure 10:
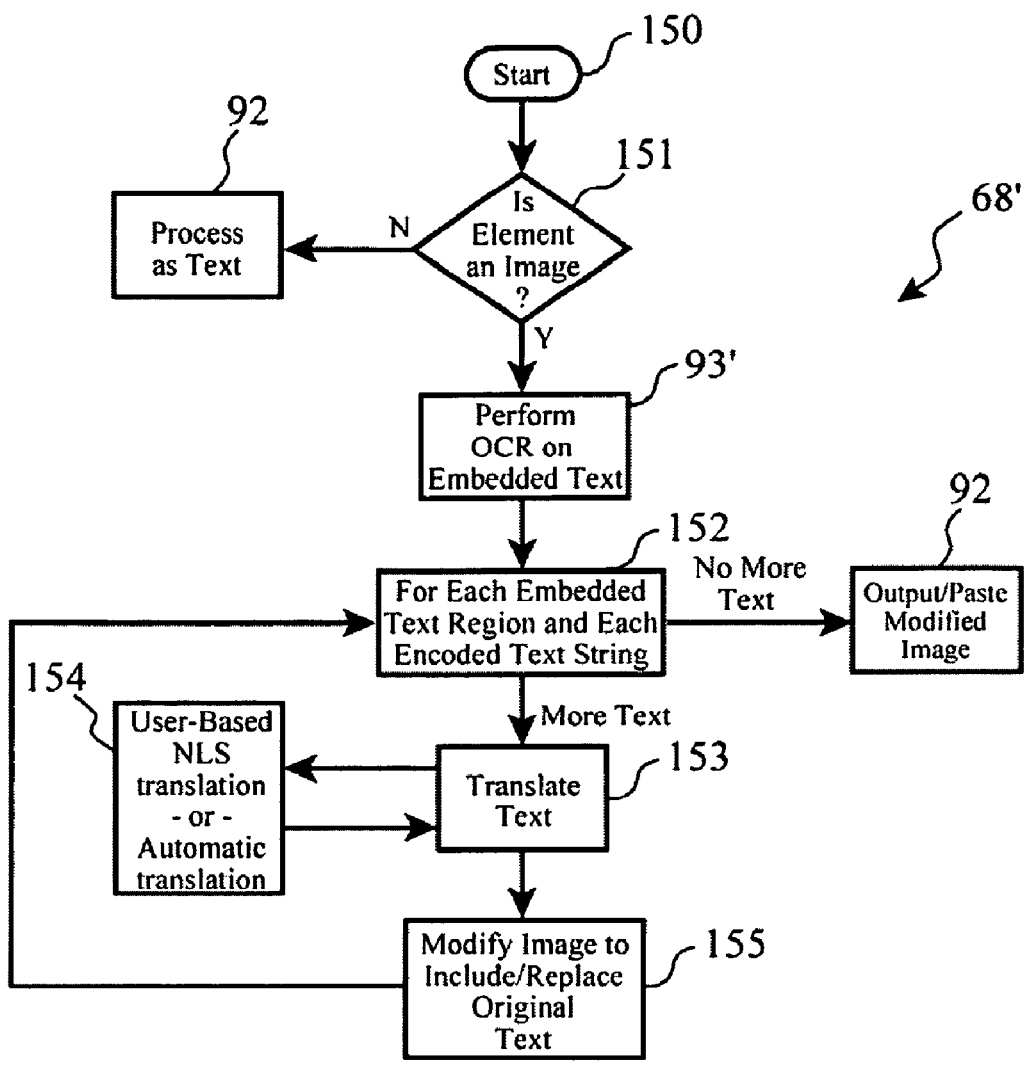
FIG. 10 provides details or our translation process for embedded or encoded text within a graphic file.

Turning to FIG. 10, details of our logical process (68') for translating the embedded text and encoded text regions is shown. For each object or element being transferred (150), the system determines whether the information element is an image or text (151). If the element is simply text (or other non-image element), the conversion process of the related inventions will proceed (92). However, if the element is an image, then OCR is performed (93') to convert regions of embedded text to text data, and encoded text is extracted, as previously described.

For each (152) embedded text region and/or each encoded text string, the corresponding text data is translated into a desired language (153) by user-based translation tool, or by invoking automated translation tool (154), such an online translation processes previously described.

Next, an image modification utility is invoked (155) to convert the translated text data into pixelated text suitable for inserting or overlaying into the original image element at the location where the original embedded text was found by the OCR process, and/or the original encoded text is replaced with the translated text (after re-encoding if necessary).

This step of our process includes, preferably, rendering an image of the translated text string using a font which is similar to or the same as the original text font, with any suitable text markings (e.g. underlines, etc.), so as to match the original appearance of the embedded text as closely as possible. Such image rendering functions themselves are well-known in the art, such as the rendering functions used by illustration tools (e.g. MS PowerPoint or Visio) to convert text data to image data.

Achieving the same appearance of encoded text is more straightforward, as the attributes of the original encoded text are readily available from typical formats of graphical objects, such as special marking (underlining, bolding, etc.), font or type set, size, color, etc. So, to replace the original encoded text with the translated text and to have a similar appearance, the text string is re-encoded with the same text attributes as the original encoded text.

At this point, the modified image file contains the newly replaced text in a desired language (155) in the region or location where the original embedded text appeared. This cycle (152, 153, 154, 155) continues until all embedded text regions and/or all encoded text strings have been translated, and their counterpart translations have been inserted or overlaid in the modified image element.

Once all regional translations are complete (152), the modified image containing the translated text is output or pasted to the destination computer resource (e.g. into the destination memory, file, object, document, etc.).

Figure 8:
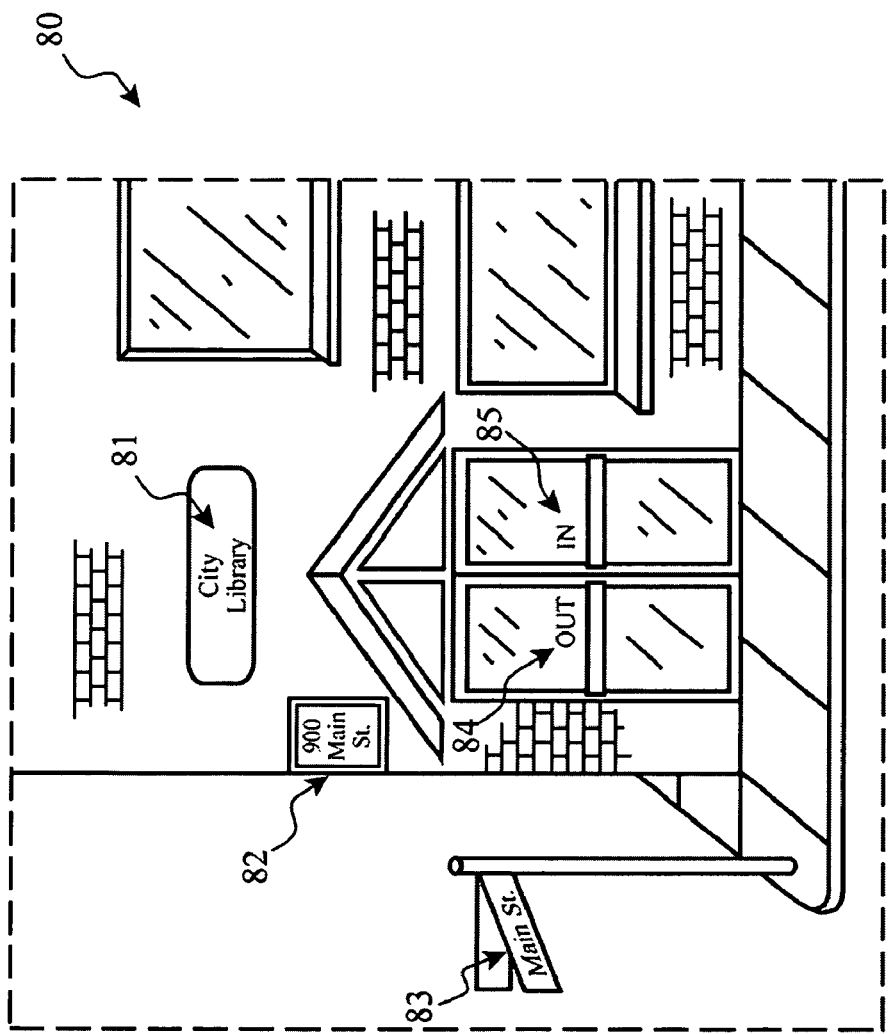
FIG. 8 depicts a source graphic file that contains embedded text and/or encoded text within the file itself.
Figure 11:
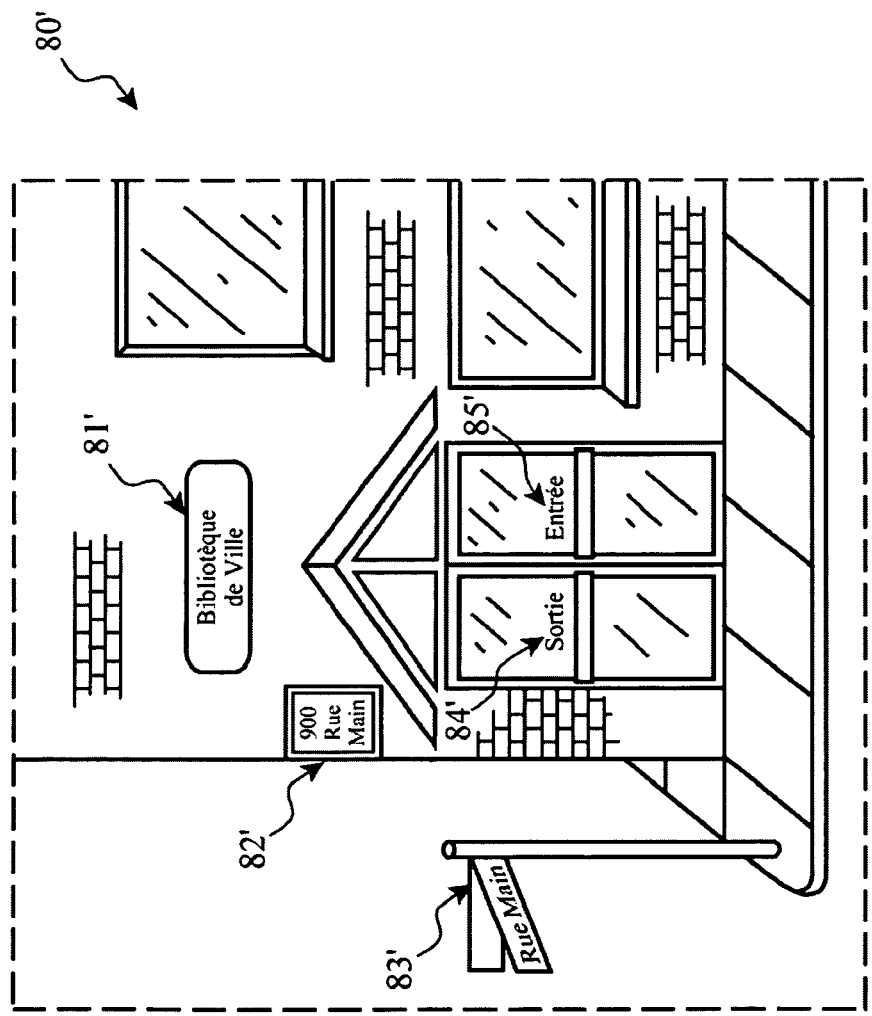
FIG. 11 illustrates a graphic file with embedded text or encoded text that has been translated using the preferred embodiment, ready for delivery, insertion or pasting into a computer destination resource (e.g. file, object, memory, etc.).

An example translated graphic image (80') is shown in FIG. 11 corresponding to our example image of FIG. 8. In this example, the source NLS was English, and our selected destination NLS was French. The first source embedded text region or encoded text string (81) which read "City Library" is translated to "Bibliothèque de Ville", and a pixelated image (81') of this French string has been overlaid or inserted in the image (80') at the same location as the original text "City Library".

Similarly, "Main Street" embedded text region or encoded text string (82, 83) has been replaced with "Rue Main" (82', 83') text, "In" embedded text region or encoded text string (85) has been replaced with "Entrée" text (85'), and "Out" embedded text region or encoded text string (84) has been replaced with "Sortie" text (84'). This modified, "translated" image is stored in a digital format, preferably of the same format as the original element (e.g. BMP, GIF, WMF, PDF, AVI, PAL, SECAM, etc.) by writing to a file, pasting into a document, etc., from the paste or transfer buffer.

CONCLUSION

As such, the present invention may be realized in a variety of forms, programming languages, methodologies, and operating systems on a variety of computing platforms without departure from the spirit and scope of the present invention. A number of example embodiment details have been disclosed as well as optional aspects of the present invention in order to illustrate the invention, but which do not define the scope of the invention. Therefore, the scope of the present invention should be determined by the following claims.

What is claimed is:

1. A system for automatic natural language translation of embedded text regions in images during information transfer, the system comprising:

a computing platform having hardware for performing a logical process;

a clipboard buffer portion of the computing platform configured to receive a copy of one or more user-selected image elements from within a source computer file responsive to user operation of a cut-and-paste command;

an isolator and interceptor portion of the computing platform configured to:
  receive a user-supplied isolation rule defining one or more types of image elements to be isolated, examine the one or more image elements in the clipboard buffer against the isolation rule,
  responsive to the one or more image elements meeting the isolation rule, transfer the one or more image elements from the clipboard buffer portion to an isolation store, and
  disable pasting of the one or more image elements into a destination computer file;

a recognizer portion of the computing platform configured to recognize text from within the one or more image elements in the isolation store;

a source language identifier portion of the computing platform configured to determine a natural language in which the recognized text is expressed;

a preference comparitor portion of a computing platform configured to determine if the natural language of the recognized text matches a user-specified destination natural language;

a translator portion of a computing platform configured to perform natural language translation of the recognized text into the user-specified destination natural language;

a text image renderer portion of a computing platform configured to produce image data for translated text;

an image modifier portion of the computing platform configured to overlay text within the one or more image elements stored in the isolation store with the image data; and a copier portion of the computing platform configured to complete pasting of the one or more image elements from the isolation store to one or more user-designated destination points within the destination computer file.

2. The system as set forth in claim 1 wherein the recognizer portion includes an Optical Character Recognizer configured to recognize regions of embedded text, and to generate text data.

3. The system as set forth in claim 1 wherein the recognizer portion comprises a Text String Extractor configured to extract strings of encoded text.

4. The system as set forth in claim 1 wherein the source language identifier portion is configured to search for each recognized character in a system alphabet corresponding to the user-specified destination natural language.

5. The system as set forth in claim 1 wherein the source language identifier portion is configured to search for each recognized word in a system dictionary corresponding to the user-specified destination natural language.

6. The system as set forth in claim 2 wherein the translator portion is configured to perform operations comprising:
  selecting an appropriate translation resource corresponding to the identified source natural language and the user-specified destination natural language, and invoking the selected translation resource.

7. The system as set forth in claim 6 wherein the source language identifier portion is configured to search for characters in one or more system alphabets, each system alphabet corresponding to a source natural language.

8. The system as set forth in claim 6 wherein the source language identifier portion is configured to search for words in one or more system dictionaries, each system dictionary corresponding to a source natural language.

9. A method for automatic natural language translation of embedded text regions in images during information transfer, the method comprising:
  a computer receiving in a clipboard buffer a copy of one or more user-selected image elements from within a source computer file responsive to user operation of a cut-and-paste command;
  the computer receiving a user-supplied isolation rule defining one or more types of image elements to be isolated;
  the computer examining the one or more image elements in the clipboard buffer against the isolation rule;
  the computer, responsive to the one or more image elements meeting the isolation rule, transferring the one or more image elements from the clipboard buffer to an isolation store, and disabling pasting of the one or more image elements into a destination computer file;
  the computer automatically recognizing text within the one or more image elements in the isolation store;
  the computer identifying a source language by determining a natural language in which the recognized text is expressed;
  the computer comparing a user preference by determining if the natural language of the recognized text matches a user-specified destination natural language;
  the computer performing automatic natural language translation of the recognized text into the user-specified destination natural language;
  the computer rendering text image data for the translated text;
  the computer overlaying the text within the one or more image elements stored in the isolation store with the rendered image data; and the computer pasting of the one or more image elements from the isolation store to one or more user-designated destination points within the destination computer file.

10. The method as set forth in claim 9 wherein the automatic recognizing comprises performing Optical Character Recognition on one or more regions of embedded text to generate text data.

11. The method as set forth in claim 9 wherein the Optical Character Recognition said comprises extracting strings of encoded text.

12. The method as set forth in claim 9 wherein the identifying of the source language comprises searching for each recognized character in a system alphabet corresponding to the user-specified destination natural language.

13. The method as set forth in claim 9 wherein the identifying of the source language comprises searching for each recognized word in a system dictionary corresponding to the destination natural language.

14. The method as set forth in claim 9 wherein the automatic translation comprises the steps of:
  selecting an appropriate translation resource corresponding to the identified source natural language and the destination natural language; and
  invoking the selected translation resource to perform translation.

15. A computer program product for automatic natural language translation of embedded text regions in images during information transfer comprising:
  one or more computer-readable, tangible storage devices;
  program instructions, stored on at least one of the one or more storage devices, to receive by a clipboard buffer portion of a computing platform configured a copy of one or more user-selected image elements from within a source computer file responsive to user operation of a cut-and-paste command;

program instructions, stored on at least one of the one or more storage devices, to receive a user-supplied isolation rule defining one or more types of image elements to be isolated;

program instructions, stored on at least one of the one or more storage devices, to examine the one or more image elements said in the clipboard buffer against the isolation rule;

program instructions, stored on at least one of the one or more storage devices, to, responsive to one or more image elements meeting the isolation rule, transferring the one or more isolation elements from the clipboard buffer to an isolation store, and to disable pasting of the image element into a destination computer file;

program instructions, stored on at least one of the one or more storage devices, to automatically recognize text within the one or more image elements in the isolation store;

program instructions, stored on at least one of the one or more storage devices, to identify a source language by determining a natural language in which the recognized text is expressed;

program instructions, stored on at least one of the one or more storage devices, to compare a user preference by determining if the natural language of the recognized text matches a user-specified destination natural language;

program instructions, stored on at least one of the one or more storage devices, to perform automatic natural language translation of the recognized text into the user-specified destination natural language;

program instructions, stored on at least one of the one or more storage devices, to render image data for the translated text;

program instructions, stored on at least one of the one or more storage devices, to overlay text within the one or more image elements stored in the isolation store with the rendered image data; and program instructions, stored on at least one of the one or more storage devices, to paste the one or more image elements from the image store to one or more user-designated destination points within the destination computer file.

16. The computer program product as set forth in claim 15 wherein the program instructions to recognize text comprises program instructions for Optical Character Recognition on one or more regions of embedded text to generate text data.

17. The computer program product as set forth in claim 15 wherein the program instructions to recognize text comprises program instructions to extract strings of encoded text.

18. The computer program product as set forth in claim 15 wherein the program instructions to identify the source language comprises program instructions to search for a character in a system alphabet corresponding to the destination natural language.

19. The computer program product as set forth in claim 15 wherein the program instructions to identify the source language comprises program instructions to search for a word in a system dictionary corresponding to the destination natural language.

20. The computer program product as set forth in claim 15 wherein the program instructions for automatic translation comprises:

program instructions to select an appropriate translation resource corresponding to the identified source natural language and the destination natural language; and program instructions to invoke the selected translation resource to perform translation.

* * * * *